United States Patent
Pulver et al.

(10) Patent No.: US 12,547,175 B2
(45) Date of Patent: Feb. 10, 2026

(54) PLANNING IN MOBILE ROBOTS

(71) Applicant: Five AI Limited, Bristol (GB)

(72) Inventors: Henry Pulver, Bristol (GB); Majd Hawasly, Bristol (GB); Subramanian Ramamoorthy, Bristol (GB); Francisco Eiras, Bristol (GB); Ludovico Carozza, Bristol (GB)

(73) Assignee: Five AI Limited, Cambridge (GB)

( * ) Notice: Subject to any disclaimer, the term of this patent is extended or adjusted under 35 U.S.C. 154(b) by 320 days.

(21) Appl. No.: 17/796,206

(22) PCT Filed: Jan. 28, 2021

(86) PCT No.: PCT/EP2021/052036
§ 371 (c)(1),
(2) Date: Jul. 28, 2022

(87) PCT Pub. No.: WO2021/152047
PCT Pub. Date: Aug. 5, 2021

(65) Prior Publication Data
US 2023/0089978 A1    Mar. 23, 2023

(30) Foreign Application Priority Data

Jan. 28, 2020 (GB) .................................... 2001200
Jan. 28, 2020 (GB) .................................... 2001202
(Continued)

(51) Int. Cl.
*G05D 1/00* (2024.01)

(52) U.S. Cl.
CPC ......... *G05D 1/0214* (2013.01); *G05D 1/0088* (2013.01); *G05D 1/0217* (2013.01);
(Continued)

(58) Field of Classification Search
CPC .. G05D 1/0214; G05D 1/0088; G05D 1/0217; G05D 1/0221; G05D 1/0238;
(Continued)

(56) References Cited

U.S. PATENT DOCUMENTS

| | | |
|---|---|---|
| 9,315,178 B1 | 4/2016 | Ferguson et al. |
| 9,632,502 B1 | 4/2017 | Levinson et al. |

(Continued)

FOREIGN PATENT DOCUMENTS

| | | |
|---|---|---|
| CN | 102449623 A | 5/2012 |
| CN | 105573323 A | 5/2016 |

(Continued)

OTHER PUBLICATIONS

Schwarting et al., "Safe Nonlinear Trajectory Generation for Parallel Autonomy With a Dynamic Vehicle Model," IEEE Transactions on Intelligent Transportation Systems, IEEE, Sep. 2018, vol. 19, No. 9, pp. 2994-3008.*

(Continued)

*Primary Examiner* — Abdalla A Khaled
(74) *Attorney, Agent, or Firm* — Andrew J. Tibbetts; Greenberg Traurig, LLP

(57) ABSTRACT

A computer system for planning mobile robot trajectories, the computer system comprising: an input configured to receive a set of scenario description parameters describing a scenario and a desired goal for the mobile robot therein; a runtime optimizer configured to compute a final mobile robot trajectory that substantially optimizes a cost function for the scenario, subject to a set of hard constraints that the final mobile robot trajectory is guaranteed to satisfy; and a trained function approximator configured to compute, from the set of scenario description parameters, initialization data defining an initial mobile robot trajectory. The computer system is configured to initialize the runtime optimizer with (Continued)

the initialization data, in order to guide the optimizer from the initial mobile robot trajectory to the final mobile robot trajectory that satisfies the hard constraints, the function approximator having been trained on example sets of scenario description parameters and ground truth initialization data for the example sets of scenario description parameters.

16 Claims, 14 Drawing Sheets

(30) Foreign Application Priority Data

| Jan. 30, 2020 | (GB) | .................................. 2001277 |
|---|---|---|
| Oct. 30, 2020 | (GB) | .................................. 2017252 |

(52) U.S. Cl.
CPC ......... *G05D 1/0221* (2013.01); *G05D 1/0238* (2013.01); *G05D 1/0246* (2013.01)

(58) Field of Classification Search
CPC .......... G05D 1/0246; B60W 2420/403; B60W 30/0956; B60W 30/18159; B60W 30/18163; B60W 60/0011; G01C 21/3407
See application file for complete search history.

(56) References Cited

U.S. PATENT DOCUMENTS

| 10,678,247 | B2 | 6/2020 | Jiang et al. |
|---|---|---|---|
| 10,884,422 | B2* | 1/2021 | Zhang .................. B60W 10/20 |
| 11,912,311 | B2* | 2/2024 | Choi ............... B60W 60/00274 |
| 12,019,447 | B2* | 6/2024 | Xia ......................... G05D 1/617 |
| 12,061,474 | B2* | 8/2024 | Di Cairano ............ G05D 1/617 |
| 2009/0240366 | A1 | 9/2009 | Kaushal et al. |
| 2017/0277193 | A1 | 9/2017 | Frazzoli et al. |
| 2018/0129203 | A1 | 5/2018 | Tafti et al. |
| 2018/0292830 | A1* | 10/2018 | Kazemi ................ G05D 1/0221 |
| 2018/0292834 | A1* | 10/2018 | Kindo ................ G01C 21/3415 |
| 2019/0079523 | A1* | 3/2019 | Zhu ....................... G05D 1/0274 |
| 2019/0220015 | A1 | 7/2019 | Phillips et al. |
| 2019/0220016 | A1 | 7/2019 | Phillips et al. |
| 2019/0286151 | A1* | 9/2019 | Palanisamy ...... G08G 1/096816 |
| 2019/0317511 | A1* | 10/2019 | Xu ........................ G05D 1/0214 |
| 2020/0134729 | A1 | 4/2020 | Matsunaga et al. |
| 2020/0310446 | A1* | 10/2020 | Zhu ....................... G05D 1/0217 |
| 2020/0310451 | A1* | 10/2020 | Zhu ....................... G05D 1/0223 |
| 2020/0326719 | A1 | 10/2020 | Tram et al. |
| 2021/0094569 | A1 | 4/2021 | Febbo et al. |
| 2021/0114617 | A1* | 4/2021 | Phillips .............. G01C 21/3453 |
| 2021/0118245 | A1 | 4/2021 | Gyllenhammar et al. |
| 2021/0221386 | A1 | 7/2021 | Quirynen et al. |
| 2021/0237769 | A1* | 8/2021 | Ostafew ................. G08G 1/042 |
| 2021/0240190 | A1* | 8/2021 | Wray .................... G06F 40/186 |
| 2021/0302974 | A1 | 9/2021 | Di Cairano et al. |
| 2021/0394794 | A1 | 12/2021 | Gyllenhammar et al. |
| 2021/0403034 | A1* | 12/2021 | Lapin ................. B60W 60/0027 |
| 2022/0055651 | A1* | 2/2022 | Baric ........................ G06N 5/01 |
| 2022/0121213 | A1* | 4/2022 | Hsu .................. B60W 30/18154 |
| 2022/0371594 | A1 | 11/2022 | Raffone et al. |
| 2023/0089978 | A1* | 3/2023 | Pulver .................. G05D 1/0238 701/26 |
| 2023/0365131 | A1* | 11/2023 | Do ........................ B60W 50/14 |

FOREIGN PATENT DOCUMENTS

| CN | 108292134 | A | 7/2018 |
|---|---|---|---|
| CN | 108604239 | A | 9/2018 |
| CN | 109910018 | A | 6/2019 |
| CN | 110271556 | A | 9/2019 |
| CN | 110462670 | A | 11/2019 |
| WO | 2017/079474 | A2 | 5/2017 |
| WO | 2017/116594 | A1 | 7/2017 |
| WO | 2020/079066 | A1 | 4/2020 |
| WO | 2020/079074 | A1 | 4/2020 |
| WO | 2020/079698 | A1 | 4/2020 |

OTHER PUBLICATIONS

Pokorny et al., "Topological trajectory classification with filtrations of simplicial complexes and persistent homology," The International Journal of Robotics Research, Aug. 21, 2015, vol. 35, Nos. 1-3, pp. 204-223.

International Search Report and Written Opinion mailed Apr. 9, 2021 in corresponding International PCT Patent Application No. PCT/EP2021/052036 (13 pages).

International Search Report and Written Opinion from the International Searching Authority from related PCT Application No. PCT/EP2021/052040, dated Mar. 29, 2021, (12 pages).

Salvado et al., "Motion Planning and Goal Assignment for Robot Fleets Using Trajectory Optimization," 2018 IEEE/RSJ International Conference on Intelligent Robots and Systems (IROS), IEEE, Oct. 1-5, 2018, pp. 7939-7946.

Hult et al., "An MIQP-based heuristic for Optimal Coordination of Vehicles at Intersections," 2018 IEEE Conference on Decision and Control (CDC), IEEE, Dec. 17-19, 2018, pp. 2783-2790.

Most, Thomas, "Approximation of complex nonlinear functions by means of neural networks," 2nd Weimar Optimization and Stochastic Days, 2005, pp. 1-17.

Eiras et al., "A Two-Stage Optimization Approach to Safe-by-Design Planning for Autonomous Driving," arXiv.org, arXiv.2002. 02215v1, Feb. 6, 2020, pp. 1-10.

International Search Report and Written Opinion from the International Searching Authority from related PCT Application No. PCT/EP2021/080206, dated May 10, 2022, (16 pages).

U.S Office Action date Sep. 3, 2024, from related U.S. Appl. No. 17/796,209.

U.S Office Action date Dec. 17, 2024, from related U.S. Appl. No. 18/011,016.

U.S. Appl. No. 17/796,209, filed Jul. 28, 2022, Majd Hawasly.

U.S. Appl. No. 18/011,016, filed Dec. 16, 2022, Francisco Eiras.

Chinese Office Action dated Apr. 23, 2025, from related Chinese Patent Application 202180057120.3 (12 pages).

Extended European Search Report dated Nov. 6, 2024, from related European Patent Application 24194819.9 (6 pages).

* cited by examiner (a) t = 0.0s (b) t = 3.2s    (c) t = 5.2s (d)

(a) $t = 0.0s$ (b) $t = 6.47s$ (c) $t = 13.47s$ (d)

PLANNING IN MOBILE ROBOTS

CROSS-REFERENCE TO RELATED APPLICATIONS

This application is the U.S. National Stage application, pursuant to 35 U.S.C. § 371, of PCT International Patent Application No. PCT/EP2021/052036, filed Jan. 28, 2021, designating the United States and published in English, which claims priority under 35 U.S.C. §§ 119 and 365 to Great Britain Patent Application No. 2001200.1, filed Jan. 28, 2020, Great Britain Patent Application No. 2001202.7, filed Jan. 28, 2020, Great Britain Patent Application No. 2001277.9, filed Jan. 30, 2020, and Great Britain Patent Application No. 2017252.4, filed Oct. 30, 2020. The contents of each of the aforementioned applications are incorporated herein by reference in their entirety.

TECHNICAL FIELD

The present invention pertains to planning in autonomous vehicles and other mobile robots.

BACKGROUND

A rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on perception inputs from the sensor system. A fully-autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Recent work in the field has considered planning formulated as a constrained non-linear optimization problem, though mainly in the context of assistive (not fully-autonomous) driving. W. Schwarting, J. Alonso-Mora, L. Paull, S. Karaman, and D. Rus, "Safe nonlinear trajectory generation for parallel autonomy with a dynamic vehicle model," IEEE Transactions on Intelligent Transportation Systems, no. 99, pp. 1-15, 2017, denoted by [C-1] herein, and incorporated herein by reference in its entirety, discloses a "Parallel Autonomy" framework which allows deviation from human driver inputs to maintain safety, but seeks to minimize extreme intervention. A receding horizon planner is formulated as Nonlinear Model Predictive Control (NMPC), subject to a set of hard constraints, namely (1) respecting a transition model of the system, including kinematic and dynamic constraints (2) maintaining the vehicle within the limits of the road and (3) avoiding other traffic participants in the sense of guaranteeing a probability of collision below $p_\epsilon$. A cost function penalizes deviation from a current acceleration and steering angle specified by a human driver—a form of "soft constraint" or "objective" according to the terminology used herein.

SUMMARY

The techniques of [C-1] formulate planning as a non-linear constrained optimization problem, and seek to solve that problem using a receding horizon formulation (the solution being a set of control inputs that optimize the cost function). It is possible to extend this framework to more complex cost functions, for example with explicit comfort objectives, or to include more sophisticated vehicle (or, more generally, mobile robot) models. However, a challenge with this approach is that convergence to an optimal set of control inputs is both slow and uncertain, particularly as the complexity of the cost function and/or the mobile robot model increases, i.e. the optimizer may take a long time to converge to a solution, or may never successfully converge. Another challenge is that non-linear constrained optimization solvers tend to be local in nature and thus have a tendency to converge to local optima which may be far from the globally optimal solution. This can significantly impact mobile robot performance.

The present invention also formulates mobile robot planning as a constrained optimization problem. Given a scenario with a desired goal, the problem is to find a series of control actions ("policy") that substantially (exactly or approximately) globally optimises a defined cost function for the scenario and the desired goal.

A core issue addressed herein is speed of convergence in constrained optimization trajectory planning, i.e. for planners that formulate trajectory planning (synthesis) as a constrained optimization subject to a set of hard constraints. Implementing constrained optimization-based planners that can not only provide highly quality trajectories but also converge to an acceptable solution (trajectory) in real-time is challenging using current hardware and state of the art solvers.

In the context of constrained optimization planning, hard constraints are constraints that a planned trajectory must be guaranteed to satisfy. These could, for example, be constraints on collision avoidance (avoiding collisions with static or moving obstacles), permitted area constraints (e.g. constraining planned trajectories to keep within a road layout or other permitted area), or comfort constraints for autonomous vehicles.

One aspect herein provides a computer system for planning mobile robot trajectories, the computer system comprising: an input configured to receive a set of scenario description parameters describing a scenario and a desired goal for the mobile robot therein; a runtime optimizer configured to compute a final mobile robot trajectory that substantially optimizes a cost function for the scenario, subject to a set of hard constraints that the final mobile robot trajectory is guaranteed to satisfy; and a trained function approximator configured to compute, from the set of scenario description parameters, initialization data defining an initial mobile robot trajectory; wherein the computer system is configured to initialize the runtime optimizer with the initialization data, in order to guide the optimizer from the initial mobile robot trajectory to the final mobile robot trajectory that satisfies the hard constraints, the function approximator having been trained on example sets of scenario description parameters and ground truth initialization data for the example sets of scenario description parameters.

The function approximator may, for example, take the form of a neural network. Function approximators may require significant amounts of data to train, and therefore require significant resources in training. However, once trained, a function approximator is efficient to implement, and can be applied to scenarios in order to generate initialization data quickly, even on resource-constrained platforms.

The initialization data provides a starting point for the search by the optimizer for a globally optimal solution (the final trajectory). It could, for example, take the form of an initial trajectory and/or an initial sequence of control actions that define the initial vehicle trajectory in conjunction with an ego dynamics model(s) (or some other initialization data derived from one of both of those).

The initial trajectory is not necessarily guaranteed to satisfy any hard constraints (even if such constrains have been imposed during training—see below). However, this is not an issue, because the initial trajectory is only used to initialize the runtime optimizer. The final trajectory determined by the runtime optimizer is guaranteed to satisfy the hard constraints.

In addition to speed/convergence time, the present disclosure addresses local optima problems that arise in the context of planning based on constrained optimization.

In general, the full constrained optimization problem to be solved is non-linear. In embodiments, the runtime planner may therefore take the form of a constrained non-linear optimizer. Non-linear optimizers are particularly vulnerable to convergence to locally but non-globally optimal solutions. However, a high-quality initialization that is reasonably close to the global optima can significantly instances of convergence to non-local optima.

In embodiments, the training data used to train the function approximator may also be generated using a constrained optimization-based planner, i.e. the function approximator may be trained to approximate (imitate) a constrained non-linear optimization.

For example, in certain embodiments, the function approximator may be trained to a multi-stage constrained optimisation planner, in which a first stage is formulated as an optimization problem that is similar to, but simpler than a more complex planning problem that ultimately needs to be solved. For example, the first stage may use a linear cost function and linear robot dynamics model. Such a problem is generally less susceptible to local optima. The solution of the first stage is then used to initialize the second stage, in which the "full" planning problem is solved. The solution of the first stage will be more likely to be close to a globally optimal solution to the full planning problem—up to up to some acceptable level of error introduced by the simplification assumptions of the first stage—and therefore reduces the tendency of the second stage to converge to local optima far from the global solution.

This two-stage approach is highly effective at preventing unwanted convergence to non-local optima. However, it is challenging to implement in real-time at present.

Note, the first and second optimization stages form part of a planner that the function approximator is trained to imitate—referred to herein as a "reference" or "expert" planner. Those stages do not need to be implemented at runtime, because the trained function approximator is implemented at runtime instead. The expert planner is therefore not required to be able to operate in real-time in order to achieve real-time operation at runtime.

The runtime optimizer is separate from both of the above constrained optimization stages—although, in some embodiments, it may implement the same or similar logic to the second stage of the multi-stage planner. In contrast to the multi-stage planner, the runtime optimizer is implemented at runtime. Because the runtime optimizer is provided with a high-quality initialization from the trained function approximator, it is significantly less likely to converge to local optima, and can also complete its search for the final mobile robot trajectory in real time.

In embodiments, the function approximator may have been trained to approximate a reference planner, the ground truth initialization data having been generated by applying the reference planner to the example training scenarios.

The runtime optimizer may be configured to determine a series of control actions, and compute the final mobile robot trajectory by applying a robot dynamics model to the series of control actions.

The initialization data may comprise an initial sequence of control actions defining the initial mobile robot trajectory.

The hard constraints may comprise one or more collision avoidance constraints for one or more static or moving obstacles in the scenario, and location(s) of the static or moving obstacles may be encoded in the set of scenario description parameters for use by the function approximator.

The hard constraints may comprise one or more permitted area constraints for keeping the mobile robot within a permitted area, and the permitted area may be encoded in the set of scenario description parameters for use by the function approximator.

The goal may be defined relative to a reference path, and the cost function may encourage achievement of the goal by penalizing at least one of lateral deviation from the reference path, and longitudinal deviation from a reference location on the reference path.

The initial and final trajectories may be represented in a frame of reference defined by the reference path.

The function approximator may have a neural network architecture.

The function approximator may have a convolutional neural network (CNN) architecture.

The computer system may be configured to transform the set of scenario description parameters into an input tensor comprising one or more images visualizing the permitted area and/or the location(s) of the obstacles.

The input tensor may comprise multiple images visualizing predicted locations of the obstacles at different time instants.

The image(s) may encode the reference path.

For example, in the case that initial and final trajectories are represented in a frame of reference defined by the reference path, the image(s) may encode the reference path by visualizing the permitted area and/or the location(s) of the obstacles in the frame of reference defined by the reference path.

The function approximator may encode the initial mobile robot trajectory as a set of smooth function parameters.

A second aspect herein provides a method of configuring a mobile robot planner, the method comprising:
  generating a training set by applying a reference planner to multiple example sets of scenario description parameters, in order to generate ground truth initialization data for the example sets of scenario description parameters, the ground truth initialization data defining a ground truth mobile robot trajectory;
  using the training set to train a function approximator to approximate the reference planer so that, when subsequently presented with a set of scenario description parameters, the function parameter computes initialization data that defines an initial mobile robot trajectory for initializing a runtime optimizer of the mobile robot planner;

configuring the mobile robot planner to use the trained function approximator to initialize the runtime optimizer, the runtime optimizer guided from the initial mobile robot trajectory to a final mobile robot trajectory that substantially optimizes a cost function for the scenario and is guaranteed to satisfy a set of hard constraints.

A third aspect herein a method of training a function approximator to imitate a reference planner (expert planner), the method comprising:

generating a training set by applying the reference planner to multiple example sets of scenario description parameters, in order to generate ground truth trajectories and/or ground truth control actions for the example sets of scenario description parameters;

using the training set to train a function approximator to approximate the reference planer so that, when subsequently presented with a set of scenario description parameters, the function parameter computes an output that defines an initial mobile robot trajectory and/or one or more control actions for the set of scenario description parameters.

In embodiments of the first or second aspects, the reference planner may be a multi-stage optimization-based planner, and the training data set may be generated by, for each example set of scenario description parameters:

in a first constrained optimization stage, applying a first optimizer to determine a first series of control actions that substantially globally optimizes a preliminary cost function for a scenario described by the set of scenario description parameters, the preliminary cost function based on a first computed trajectory of the mobile robot, as computed by applying a preliminary robot dynamics model to the first series of control actions, and in a second constrained optimization stage, applying a second optimizer to determine a second series of control actions that substantially globally optimizes a full cost function for the scenario, the full cost function based on a second computed trajectory of the mobile robot, as computed by applying a full robot dynamics model to the second series of control actions;

wherein initialization data of at least one of the first computed trajectory and the first series of control actions may be used to initialize the second optimizer for determining the second series of control actions, and wherein the preliminary robot dynamic model may approximate the full robot dynamics model, the cost functions embody similar objectives to each encourage achievement of a desired goal, and both are optimized with respect to similar hard constraints, such that the initialization data guides the second optimizer to the substantially globally-optimal second series of control actions.

Note, this "initialization data" is internal to the multi-stage planner, and is separate from the "initialization data" provided by the trained function approximator at runtime. It will be clear in context which is meant. Where useful to distinguish explicitly, the former may be referred to as "internal initialization data", and the latter may be referred to as "runtime initialization data".

The function approximator may be trained using Dataset Aggregation, by applying the function approximator in simulation to determine additional sets of scenario description parameters, applying the reference planner to the additional sets of scenario description parameters to compute ground truth initialization data for the new sets of scenario description parameters, and re-training the function approximator based thereon.

The runtime optimizer may be a non-linear optimizer.

The "full" multi-stage optimization approach mentioned above may be implemented as follows, in order to generate training data for training the function approximator.

As noted, in embodiments the runtime optimizer may implement the same or similar logic to the second constrained optimization stage of the multi-stage optimization-based planner. All disclose below pertaining to the second constrained optimization phase applies equally to the runtime optimizer in such embodiments.

The two-stage optimization approach may be implemented as computer-implemented method of determining control actions for controlling a mobile robot, the method comprising:

receiving a set of scenario description parameters describing a scenario and a desired goal for the mobile robot therein;

in a first constrained optimization stage, applying a first optimizer to determine a first series of control actions that substantially globally optimizes a preliminary cost function for the scenario, the preliminary cost function based on a first computed trajectory of the mobile robot, as computed by applying a preliminary robot dynamics model to the first series of control actions, and in a second constrained optimization stage, applying a second optimizer to determine a second series of control actions that substantially globally optimizes a full cost function for the scenario, the full cost function based on a second computed trajectory of the mobile robot, as computed by applying a full robot dynamics model to the second series of control actions;

wherein initialization data of at least one of the first computed trajectory and the first series of control actions is used to initialize the second optimizer for determining the second series of control actions, and wherein the preliminary robot dynamic model approximates the full robot dynamics model, the cost functions embody similar objectives to each encourage achievement of the desired goal, and both are optimized with respect to similar hard constraints, such that the initialization data guides the second optimizer to the substantially globally-optimal second series of control actions.

A less-complex cost function and dynamics model can be used in the first stage, whilst still providing an effective initialization to the second stage. In the present context, the term complexity refers to the form of the cost function and the model, in the space of variables over which they are defined.

A robot dynamics model is a predictive component that predicts how the mobile robot will actually move in the scenario in response to a given sequence of control actions, i.e. it models the mobile robot's response to control actions. A higher-complexity model, as used in the second stage, can model that response more realistically. The lower-complexity model is free to use highly-simplifying assumptions about the behaviour of the mobile robot but these may be relatively unrealistic. Depending on the simplifying assumptions applied in the first stage, the first predicted trajectory may not even be fully dynamically realisable.

A higher-complexity cost function and model, as used in the second stage, can provide superior trajectories, which may be of sufficient quality that they can be used as a basis for effective planning and/or control decisions. However, generally speaking, higher-quality trajectories will be obtained when convergence to an approximately globally optimal solution (i.e. at or near a global optima of the full cost function) is achieved. As the complexity of the full cost function and model increases, achieving such convergence becomes increasingly dependent on the quality of the initialization.

By contrast, the simplifying assumptions applied in the first stage make it inherently less susceptible to the problem of non-local optima, i.e. the ability of the first optimizer to converge to an approximately globally optimal solution is far less dependent on any initialization of the first optimization phase. The output of the simplified first stage is unlikely to be of sufficient quality to use as a basis for such planning decisions directly, and the trajectories it produces may not even be full dynamically realisable (depending on the simplifying assumptions that are made in the first stage). Nevertheless, provided the solution of the first stage is reasonably close to the globally optimal solution of the second stage, the initialization data of the first stage can still facilitate faster and more reliable convergence to an approximately globally optimal solution in the second stage, which will correspond to a dynamically realisable trajectory.

The present invention thus benefits from the high-quality output of the more complex second stage, whilst avoiding (or at least mitigating) the issues of local optima convergence that would otherwise come with it, through the provision of an effective initialization to the second stage.

The described embodiments consider a two-stage constrained optimization. However, other embodiments may use more than two stages. In that case, the first constrained optimization stage that is applied to determine the initialization data could, itself, be a multi-stage optimization. In that case, two or more preliminary cost functions may be optimized in the first stage, with at least one of the preliminary cost functions being optimized in order to initialize another of the preliminary cost functions, before ultimately determining the initialization data to the above-mentioned second constrained optimization stage.

In embodiments, the computed trajectory may be determined, based on an initial mobile robot state, as a series of subsequent mobile robot states. Each mobile robot state of the first computed trajectory may be determined by applying the full robot dynamics model to at least the previous mobile robot state of the first computed trajectory and a corresponding control action of the first series of control actions. Each mobile robot state of the second computed trajectory may be determined by applying the full robot dynamics model to at least the previous mobile robot state of the second computed trajectory and a corresponding control action of the second series of control actions.

The preliminary robot dynamics model may be linearly dependent on at least the previous mobile robot state of the first computed trajectory and the corresponding control action of the first series of control actions, and the full robot model may be non-linearly dependent on at least one of the previous mobile robot state of the second computed trajectory and the corresponding control action of the second series of control actions.

The preliminary cost function may be linearly dependent on the mobile robot states of the first computed trajectory, and the full cost function may be non-linearly dependent on the mobile robot states of the second computed trajectory.

The preliminary cost function may be linearly dependent on the control actions of the first series, and the full cost function may be non-linearly dependent on the control actions of the second series.

The first optimizer may be a mixed integer linear programming (MILP) optimizer, and the second optimizer may be a non-linear programming (NLP) optimizer.

The hard constraints of the first stage may comprise one or more mixed integer collision avoidance constraints for one or more static or moving obstacles in the scenario and/or one or more mixed integer permitted area constraints for keeping the mobile robot within a permitted area. The hard constraints of the second stage may comprise one or more similar collision avoidance and/or permitted area constraints formulated in terms of non-integer variables.

The first optimizer may apply a receding horizon approximation to iteratively optimize component costs of the preliminary cost function, and thereby determine the first series of control actions, and the second optimizer may not use any receding horizon approximation and may instead optimize the full loss function as a whole.

The goal may be defined relative to a reference path, and each cost function may encourage achievement of the goal by penalizing at least one of lateral deviation from the deference path, and longitudinal deviation from a reference location on the reference path.

Each of the computed trajectories may be represented in a frame of reference defined by the reference path.

The preliminary cost function may be linearly dependent on the above lateral and/or longitudinal deviation, and the full cost function is non-linearly dependent thereon.

Both cost functions may penalize deviation from a target speed.

The method may be implemented in a planner of a mobile robot and comprise the step of using control data of at least one of: the second computed trajectory, and the second series of control actions to control motion of the mobile robot.

Embodiments and optional implementations of the invention address the problem of speed though the use of function approximation. Depending on the resources of the available hardware platform, there may be occasions when running the first and second optimizations in real-time is not feasible. As an optional optimization, one or both of the optimizers may be replaced, in a real-time context, with a function approximator training to approximate the first and/or second optimization stage as applicable.

For example, the method may be performed repeatedly for different scenarios so as to generate a first training set comprising inputs to the first optimizer and corresponding outputs computed by the first optimizer, and the training set may be used to train a first function approximator to approximate the first optimizer (training method 1).

Alternatively or additionally, the method may be performed repeatedly for different scenarios so as to generate a second training set comprising inputs to the second optimizer and corresponding outputs computed by the second optimizer, and the training set may be used to train a second function approximator to approximate the second optimizer (training method 2).

The method may comprise the step of configuring a runtime stack of mobile robot to implement one of the following combinations:

(i) the first optimiser and the second function approximator, wherein the second function approximator cooperates with the first optimiser within the run-time stack to approximate the second optimization stage;

(ii) the first function approximator and the second optimizer, wherein the first function approximator approximates the first optimization stage for initializing the second optimizer; and (iii) the first function approximator and the second function approximator, which cooperate to approximate both optimization stages.

Alternatively, the method may be performed repeatedly for different scenarios so as to generate a training set comprising inputs to the first optimizer and corresponding outputs computed by the second optimizer, and the training set may be used to train a single function approximator to approximate both of the first and the second optimizers (training method 3).

The method may comprise the step of configuring a runtime stack of mobile robot to implement the single function approximator.

The runtime stack may be configured to implement one of combinations (i) and (ii), or the single function approximator, and the method may comprise an additional step of configuring the runtime stack with a verification component configured to verify an output of the second function approximator or the single function approximator.

A further aspect of the invention provides a computer-implemented method of determining control actions for controlling a mobile robot, the method comprising:

receiving a set of scenario description parameters describing a scenario;

in a first constrained optimization stage, applying a first optimizer to determine a first series of control actions that substantially optimize a lower-complexity cost function for the scenario, the lower-complexity cost function dependent on a first computed trajectory of the mobile robot, as computed by applying a lower-complexity robot dynamics model to the first series of control actions, and in a second constrained optimization stage, applying a second optimizer to determine a second series of control actions that substantially optimize a higher-complexity cost function for the scenario, the higher-complexity cost function dependent on a second computed trajectory of the mobile robot, as computed by applying a higher-complexity robot dynamics model to the second series of control actions;

wherein the lower-complexity robot dynamic model approximates the higher-complexity robot dynamics model, wherein the cost functions embody similar objectives to each encourage achievement of a desired goal in the scenario, and both are optimized with respect to similar hard constraints, such that the first computed trajectory approximates the second computed trajectory, and wherein initialization data of at least one of the first computed trajectory and the first series of control actions is used to initialize the second optimizer for determining the second series of control actions.

A further aspect herein provides a computer system comprising one or more optimization components configured to implement or approximate: a first optimization stage as defined in any of the above aspects or embodiments; and a second optimization stage as defined in any of the above aspects or embodiments.

The one or more optimization components may comprise a first optimization component configured to implement or approximate the first optimization stage, and a second optimization component configured to implement or approximate the second optimization stage, using initialization data provided by the first optimization component.

The first optimization component may take the form of a first function approximator trained in accordance with training method 1 above and/or the second optimization component may take the form of a second function approximator trained in accordance with training method 2 above to approximate the second optimization stage.

The second optimization component may take the form of a second function approximator, and the computer system may additionally comprise a verification component configured to verify at least one of a second trajectory and a second series of control actions computed by the second function approximator.

The one or more optimization components may comprise a single optimization component, trained in accordance with training method 3 above, to approximate both of the first and second optimization stages.

The computer system may additionally comprise a verification component configured to verify at least one of a second trajectory and a second series of control actions computed by the single function approximator.

The or each function approximator may have a neural network architecture.

In alternative embodiments, the function approximator may be trained to implement a different form of expert planner. For example, the function approximator may be trained to implement only the first constrained optimization stage (in which case only that stage need be implemented in order to generate the training data), and this can still provide an acceptable initialization.

The computer system may be embodied in an autonomous vehicle or other mobile robot, wherein the computer system may be further configured to control the motion of the mobile robot via one or more actuators of the mobile robot using control data provided by the second optimization component.

A further aspect herein provides a computer program for programming one or more computers to implement any of the methods disclosed herein.

BRIEF DESCRIPTION OF FIGURES

To assist understanding of the present disclosure and to show how embodiments of the present invention may be put into effect, reference is made by way of example to the accompanying drawings, in which.

DETAILED DESCRIPTION

Various embodiments of the present disclosure are described below. The described embodiments provide what is referred to herein as a "PILOT" planner. This is a trajectory planner, in which a trained function approximator provides an initialization to a runtime optimizer. The PILOT planner is able to find, in real-time, a final mobile robot trajectory that is substantially optimal, in the sense optimizing one or more soft constraints for a given scenario, but which is also guaranteed to satisfy a set of hard constraints for the scenario.

In some of the described embodiments, the function approximator is trained to approximate all or part of a multi-stage optimization-based planner, which is described in detail below to provide context.

I. Example Context

Embodiments are described in the context of an autonomous vehicle. However, the description applies equally to other forms of autonomous mobile robot.

Figure 1:
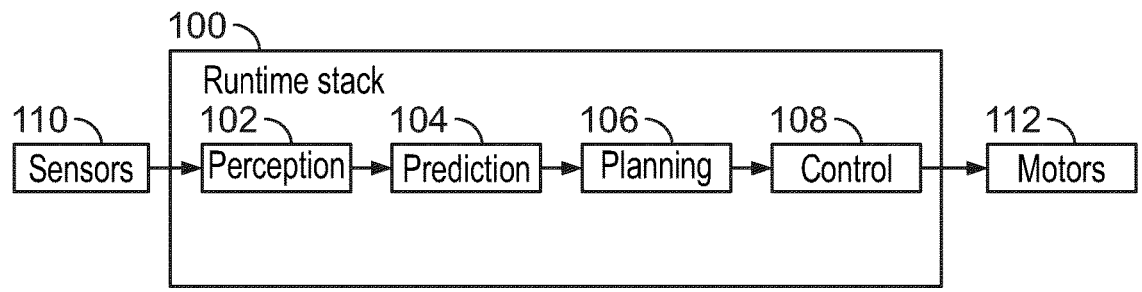
FIG. 1 shows a schematic block diagram of an autonomous vehicle runtime stack.

FIG. 1 shows a highly schematic block diagram of a runtime stack 100 for an autonomous vehicle (AV). The run time stack 100 is shown to comprise a perception stack 102, a prediction stack 104, a planner 106 and a controller 108.

The perception stack 102 receives sensor outputs from an on-board sensor system 110 of the AV.

The on-board sensor system 110 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LiDAR, RADAR etc.

Stereo imaging may be used to collect dense depth data, with LiDAR/RADAR etc. proving potentially more accurate but less dense depth data. More generally, depth data collection from multiple sensor modalities may be combined in a way that respects their respective levels (e.g. using Bayesian or non-Bayesian processing or some other statistical process etc.). Multiple stereo pairs of optical sensors may be located around the vehicle e.g. to provide full 360° depth perception. This provides a much richer source of information than is used in conventional cruise control systems.

The perception stack 102 comprises multiple perception components which co-operate to interpret the sensor outputs and thereby provide perception outputs to the prediction stack 104.

The perception outputs from the perception stack 102 are used by the prediction stack 104 to predict future behaviour of the external actors.

Predictions computed by the prediction stack 104 are provided to the planner 106, which uses the predictions to make autonomous driving decisions to be executed by the AV in a way that takes into account the predicted behaviour of the external actors.

The planner 106 implements the techniques described below to plan trajectories for the AV and determine control actions for realizing such trajectories. In particular, a core function of the planner 106 is to determine a series of control actions for controlling the AV to implement a desired goal in a given scenario. In a real-time planning context, a scenario is determined using the perception stack 102 but can also incorporate predictions about other actors generated by the prediction stack 104. A scenario is represented as a set of scenario description parameters used by the planner 106. A typical scenario would define a drivable area and would also capture predicted movements of any obstacles within the drivable area (such as other vehicles) along with a goal. A goal would be defined within the scenario, and a trajectory would then need to be planned for that goal within that scenario. In the following, obstacles are represented probabilistically in a way that reflects the level of uncertainty in their perception within the perception stack 102.

The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to on-board actuators 112 such as motors of the AV. In particular, the controller 108 controls the actuators in order to control the autonomous vehicle to follow a trajectory computed by the planner 106.

As described in further detail below, the planner 106 plans over acceleration (magnitude) and steering angle control actions simultaneously, which are mapped to a corresponding trajectory by modelling the response of the vehicle to those control actions. This allows constraints to be imposed both on the control actions (such as limiting acceleration and steering angle) and the trajectory (such as collision-avoidance constraints), and ensures that the final trajectories produced are dynamically realisable. The planner 106 will determine an optimal trajectory and a corresponding sequence of control actions that would result in the optimal trajectory according to whatever vehicle dynamics model is being applied. The control actions determined by the planner 106 will not necessarily be in a form that can be applied directly by the controller 108 (they may or may not be). Ultimately, the role of the planner 106 is to plan a trajectory and the role of the controller 108 is to implement that trajectory. The term "control data" is used herein to mean any trajectory information derived from one of both of the planned trajectory and the corresponding series of control actions that can be used by the controller 108 to realize the planner's chosen trajectory. For example, the controller 108 may take the trajectory computed by the planner 106 and determine its own control strategy for realizing that trajectory, rather than operating on the planner's determined control actions directly (in that event, the controller's control strategy will generally mirror the control actions determined by the planner, but need not do so exactly).

The planner 106 will continue to update the planned trajectory as a scenario develops. Hence, a trajectory determined at any time may never be realized in full, because it will have been updated before then to account for changes in the scenario that were not predicted perfectly.

These functions of the planner 106 will now be described in detail. As set out above, the present disclosure addresses the planning problem of determining an optimal series of control actions (referred to herein as a "policy") for a given scenario and a given goal as a constrained optimization problem with two optimization stages.

In the described embodiments, the first optimization stage solves a Mixed Integer Linear Programming (MILP) problem where obstacles lead to hard constraints for the MILP. The outcome of this seeds (initializes) a subsequent nonlinear optimisation of the trajectory for dynamics and comfort constraints, in the second optimization stage. The second optimization stage solves a Non-Linear Programming (NLP) problem, initializing using the results of the MILP optimization stage. The MILP stage uses a mixed-integer formulation of collision avoidance and drivable area constraints as described later.

Although performed second, the NLP stage is described first, in order to set out the final planning problem that ultimately needs to be solved (Problem 2 below), and to provide some context for the subsequent description of how best to provide an effective initialization (seed) from the MILP stage.

Before describing either stage in detail, the description sets out a general framework applicable to both stages.

II. Preliminaries and Problem Statement

A. Notation and Definitions

Following notation from [C-1], an index $k \equiv t_k$, is assumed where $t_k = t_0 + k\Delta t$ with $t_0$ being the current time and $\Delta t$ a fixed timestep. A trajectory is defined over the next N steps covering a temporal horizon of $\tau = N \Delta L$. Vectors are in bold. A shorthand notation $r_{i:e} = \{r_i, \ldots, r_e\}$ is used for any variable r.

A vehicle whose motion is being planned is referred to as the ego vehicle. The ego vehicle's state at time k is given by $X_k = (X_k, Y_k, V_k, \Phi_k) \in \mathcal{W}_\chi$, where $(X_k, Y_k)$ is the position of the vehicle, $V_k$ is the speed and $\Phi_k$ is its heading in a global coordinate frame $\mathcal{W}$. The ego state at time 0 is given by $X_0$, and a function of the planner 106 is to determine the ego states over the next N steps, $X_{1:N} \in \mathcal{W}_\chi^N$.

Other traffic participants, such as vehicles, pedestrians and cyclists, are indexed by $i \in \{1, \ldots, n\}$ and their pose at time k is modelled using a Gaussian distribution having a mean $O_k^i = (X_k^i, Y_k^i, \Phi_k^i) \in \mathcal{W}_O$ and covariance $\Gamma_k^i$. The set of the mean poses of all traffic participants over time is $O_{0:N}^{1:n}$, and similarly for the covariances $\Gamma_{0:N}^{1:n}$, and both are given as inputs to the planning problem.

B. Reference Path-Based Representation

To simplify the process of defining a planning goal, the global coordinate frame is transformed to a reference path-based representation under an invertible transform $\mathcal{T}$ as described in Sec. II-B. This representation significantly simplifies the problem of path tracking.

A goal of the ego vehicle is defined as following a differentiable and bounded two-dimensional reference path in the global coordinate frame, $\mathcal{P}_{ref}$ parameterized by the distance from the start of the path $(X^{\mathcal{P}\text{ref}}(\lambda), Y^{\mathcal{P}\text{ref}}(\lambda))$. Tangential and normal vectors of the reference path in the global coordinate frame can be obtained at any point A along the path $\mathcal{P}_{ref}$ as $$t_\lambda = \begin{bmatrix} \frac{\partial X^{\mathcal{P}ref}(\lambda)}{\partial \lambda} \\ \frac{\partial Y^{\mathcal{P}ref}(\lambda)}{\partial \lambda} \end{bmatrix}, n_\lambda = \begin{bmatrix} \frac{-\partial Y^{\mathcal{P}ref}(\lambda)}{\partial \lambda} \\ \frac{\partial X^{\mathcal{P}ref}(\lambda)}{\partial \lambda} \end{bmatrix} \quad (1)$$

respectively.

The reference path $\mathcal{P}_{ref}$ is a path which the ego vehicle is generally intending to follow, at a set target speed. However, deviation from the reference path and target speed, whilst discouraged, are permitted provided that no hard constraints (such as collision avoidance constraints) are breached. The reference path can be determined using knowledge of the road layout, which may use predetermined map data (such as an HD map of the driving area), information from the perception stack 104, or a combination of both. For complex layouts in particular (such as complex junctions or roundabouts), the reference path could be learned by monitoring the behaviour of other drivers in the area over time.

Figure 2A:
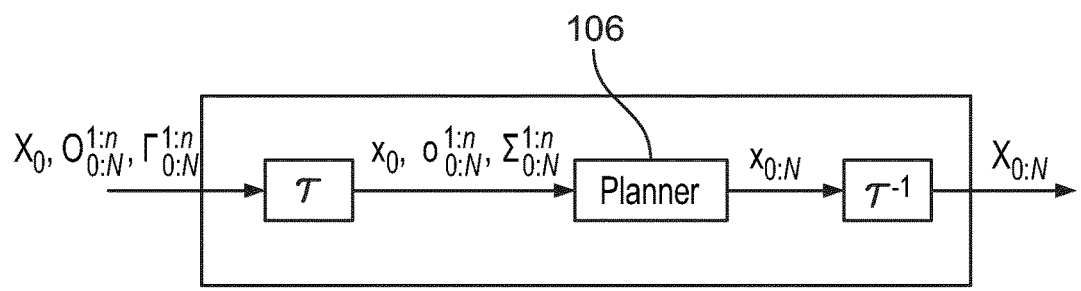
FIG. 2A shows mathematical transformations to and from a reference-path based frame of reference.

FIG. 2A illustrates the process of going from an input $(X_0, O_{0:N}^{1:n}, \tau_{0:N}^{1:n})$ to the desired output $X_{1:N}$. Given an input $(X_0, O_{0:N}^{1:n}, \Gamma_{0:N}^{1:n})$ (upper case) the invertible transformation $\mathcal{T}$ is applied to yield $(x_0, o_{0:N}^{1:n}, \Sigma_{0:N}^{1:n})$ (lower case) in the reference path-based representation, which the planner 106 then uses to plan. The output of the planner 106 is an intended trajectory $x_{0:N}$ in the reference path-based representation, which in turn is transformed back to the global coordinate frame by applying the inverse transformation $\mathcal{T}^{-1}$ to obtain $X_{0:N}$ in the global coordinate frame. Further details of the transformation are described below.

The invertible transform $\mathcal{T}$ operates over three types of input: (1) poses, (2) velocities and (3) covariance matrices. Each of the individual operations is described next.

Figure 2B:
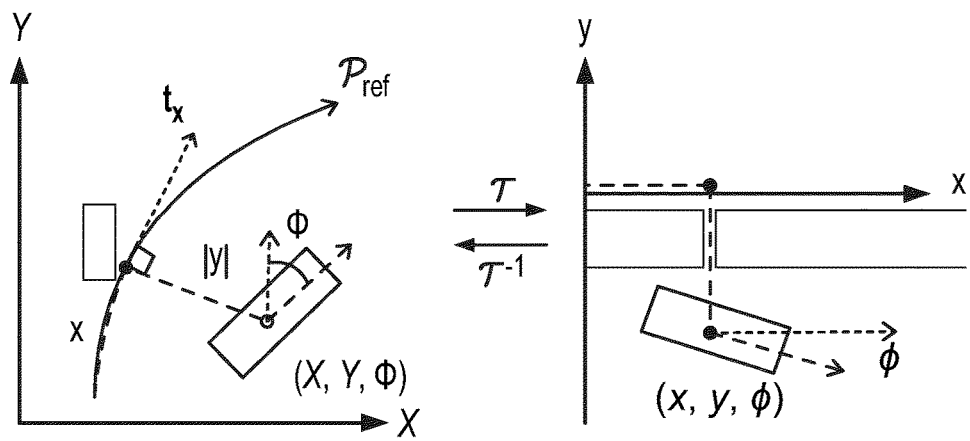
FIG. 2B geometrically depicts a representation from a global frame of reference into a reference path-based frame of reference.

1) Pose transform: $\mathcal{T}$ maps poses $(X, Y, \Phi)$ in the global coordinate frame $\mathcal{W}$ to poses $(x, y, \phi)$ in the reference path frame $\mathcal{W}_r$ as shown in FIG. 2B.

x=proj$_{\mathcal{P}\text{ref}}$ [X Y] is the distance of the projection of [X Y] to $\mathcal{P}_{ref}$ from the beginning of the path, defined as the solution to the following optimization problem:

$$\operatorname*{argmin}_\lambda (X - X^{\mathcal{P}ref}(\lambda))^2 + (Y - Y^{\mathcal{P}ref}(\lambda))^2.$$

Due to the nature of the optimization, no closed-form solution can be obtained for x.

$$y = \frac{1}{\|n_x\|} n_x^T \cdot \hat{y},$$

where $n_x$ is me normal vector of the reference path at $\lambda = x$ as in (1), $$\text{and } \hat{y} = \begin{bmatrix} X - X^{\mathcal{P}ref}(x) \\ Y - Y^{\mathcal{P}ref}(x) \end{bmatrix}.$$

-continued $$\phi = Lt_x - \Phi, \text{ where } Lt_x = \arctan\left(\frac{\partial Y^{\mathcal{P}_{ref}}(\lambda)}{\partial X^{\mathcal{P}_{ref}}(\lambda)}\bigg|_{\lambda=x}\right)$$

FIG. 2B shows a visual representation of the transform $\mathcal{T}$ between the world frame of reference and the reference path-based frame, and $\mathcal{T}^{-1}$, the inverse transform.

As will be appreciated, the inverse transformation $\mathcal{T}^{-1}$ can be derived straightforwardly by applying the same geometric principles.

2) Velocity transform: since $\mathcal{T}$ is defined spatially, speeds are invariant to it: $v = \mathcal{T}(V) = V$.

3) Covariance transform: considering a traffic participant with pose O and covariance $\Gamma$, such that $\mathcal{T}(O) = [x\ y\ \phi]^T$, the transformed covariance matrix in the reference path coordinate frame is given by:

$$\Sigma = \mathcal{T}(\Gamma) = R(\angle t_x - \phi)\Gamma R(\angle t_x - \phi)^T \quad (2)$$

where $t_x$ is the tangent of $\mathcal{P}_{ref}$ evaluated at $\lambda = x$, and $R \in SO(2)$ is a rotation matrix.

C. Problem Statement

Following the reasoning presented in Sec. II-A, the planning problem is defined in the reference path coordinate frame.

The state of the ego vehicle at time k is given by $x_k = (x_k, y_k, v_k, \phi_k) \in X$ where $(x_k, y_k)$ is the 2D position of the vehicle, $v_k$ is its speed and $\phi_k$ is its heading. The evolution of the vehicle state is given by a discrete general dynamical system:

$$x_{k+1} = f_{\Delta t}(x_k, u_k), \quad (3)$$

where $f_{\Delta t}$ is a discrete non-linear function with time parameter $\Delta t$, and $u_k = (a_k, \delta_k) \in \mathbb{R}$ are an acceleration and steering angle, respectively, applied at time k. The ego vehicle is modelled as a rigid body occupying an area $S_e \subset \mathbb{R}^2$ relative to its center, and the area occupied by the ego vehicle at state $x_k$ is given by $S(x_k) \subset \mathbb{R}^2$.

For other traffic participants, pose at time k is described probabilistically with mean $o_k^i = (x_k^i, y_k^i, \phi_k^i) \in O$ and covariance $\Sigma_k^i$, for $i \in \{1, \ldots, n\}$. Following the definition from [C-1], the area each traffic participant occupies is defined as $S^i(o_k^i, \Sigma_k^i, p_\epsilon) \subset \mathbb{R}^2$ with probability larger than $p_\epsilon$.

A driveable surface area $\mathcal{B} \subset \mathbb{R}^2$ is defined as the area in which it is safe for the ego vehicle to drive, with the unsafe area $\mathcal{B}_{out} = \mathbb{R}^2 \setminus \mathcal{B}$. With a cost function $J(x_{0:N}, u_{0:N-1}, o_{0:N}^{1:n}, \Sigma_{0:N}^{1:n})$ defined over the positions and controls of the ego vehicle and states and uncertainties of other traffic participants, a "policy synthesis" problem can be formulated.

As indicated above, a "policy" in the present context refers to a time-series of control actions, which is mapped to a corresponding vehicle trajectory using a vehicle dynamics model.

Problem 1 (Policy Synthesis). Given an initial ego state $x_0$, and trajectories of other traffic participants $(o_{0:N}^{1:n}, \Sigma_{0:N}^{1:n})$, compute an optimal policy:

$$u_{0:N-1}^* = \underset{u_{0:N-1}}{\operatorname{argmin}} J\left(x_{0:N}, u_{0:N-1}, o_{0:N}^{1:n}, \Sigma_{0:N}^{1:n}\right) \text{ s.t.} \quad (4)$$

$$\forall k \in \{0, \ldots, N\}:$$

$$x_{k+1} = f_{\Delta t}(x_k, u_k)$$

$$S(x_k) \cap \mathcal{B}_{out} = \emptyset$$

$$S(x_k) \cap \left[\bigcup_{i \in \{1, \ldots, n\}} S^i\left(o_k^i, \Sigma_k^i, p_\epsilon\right)\right] = \emptyset$$

III. Non-Linear Programming Formulation

This section describes a specific solution to Problem 1, posing it as a Non-Linear Programming (NLP) problem with a set of hard constraints and a multi-objective cost function. The hard constraints comprise (1) vehicle model constraints, including kinematic ones on the transitions of the model and on the controls it allows (Sec. III-1); and (2) collision avoidance constraints with the purpose of avoiding collisions with the boundaries of the road (which can include, e.g. construction areas or parked vehicles) as well as other traffic participants (Sec. III-2). Soft constraints make up the terms of the cost function (i.e. are embodied in the cost function itself) and are presented in Sec. III-3, whereas hard constraints constrain the optimization of the cost function. Sec. III-4 describes the full problem.

1) Vehicle Model: A "kinematic bicycle" model is applied, which is a simplified car model focused on the center of the vehicle. Assuming the ego vehicle to be a rectangle with an inter-axel distance of L, this model can be discretized under $\Delta t$ as:

$$\begin{bmatrix} x_{k+1} \\ y_{k+1} \\ \phi_{k+1} \\ v_{k+1} \end{bmatrix} = \begin{bmatrix} x_k \\ y_k \\ \phi_k \\ v_k \end{bmatrix} + \begin{bmatrix} v_k \cos(\phi_k + \delta_k) \\ v_k \sin(\phi_k + \delta_k) \\ \frac{2v_k}{L}\sin(\delta_k) \\ a_k \end{bmatrix} \Delta t \quad (5)$$

While the kinematic bicycle model is not strictly limited by any specific values of maximum steering and acceleration, a limit is imposed on the allowed ranges of controls by enforcing $|\delta_k| \leq \delta_{max}$ and $a_{min} \leq a_k \leq a_{max}$, as well as limiting jerk $|a_{k+1} - a_k| \leq \dot{a}_{max}$ and angular jerk $|\delta_{k+1} - \delta_k| \leq \dot{\delta}_{max}$. These maintain the model within the operational domain, and also help to ensure that the resulting trajectories respect the rules of the road and passenger comfort. Finally, speed is constrained as $0 \leq v_{min} \leq v_k \leq v_{max}$, to guarantee forward motion within a set speed limit $v_{max}$.

2) Collision Avoidance: The collision avoidance problem is divided into two different types of avoidance: the limits of the road (which may include other features such as construction zones or parked vehicles) and other traffic participants. For both, a representation of the area of the ego-vehicle is defined as $S(x_k)$ for state $x_k$. A simplified representation is used wherein the ego vehicle boundary is represented solely by its corners. For a rectangular vehicle of width w and length l, the positions of the corners can be defined as a function of the state $x_k$ as:

$$c^z(x_k) = \begin{bmatrix} x_k^z \\ y_k^z \end{bmatrix} = R(\phi_k)\left(z^T \circ \begin{bmatrix} w/2 \\ l/2 \end{bmatrix}\right) + \begin{bmatrix} x_k \\ y_k \end{bmatrix} \quad (6)$$

where $z \in Z = \{[1\ 1], [-1\ 1], [-1\ -1], [1\ -1]\}$, $R(\phi_k) \in SO(2)$ is the rotation matrix corresponding to the ego-vehicle's heading, and $\circ$ is the Hadamard product. Following this definition, the maintenance of the ego-vehicle within the driveable surface, corresponding to the constraint defined as $S(x_k) \cap \mathcal{B}_{out} = \emptyset$, can be reduced to the constraint $$\forall z \in Z : c^z(x_k) \in B. \quad (7)$$

The driveable surface $\mathcal{B}$ is described by limits, $b_l(\lambda)$, $b_r(\lambda)$, which are continuous and differentiable functions of $\lambda$ defining the left and right borders, respectively, with $\forall \lambda$: $b_l(\lambda) < b_r(\lambda)$. These boundaries impose a constraint on the allowed lateral deviation at position x, such that keeping the ego-vehicle within the driveable surface, $\mathcal{S}(x_k) \cap B_{out} = \emptyset$, can be reduced to the set of constraints $$\forall z \in \mathcal{Z} : b_l(x_k^z) \le y_k^z \le b_r(x_k^z), \tag{8}$$

with $[x_k^z, y_k^z]^T$ defined as in (6).

For other traffic participants, the area occupied $\mathcal{S}^i(o_k^i, \Sigma_k^i, p_\epsilon)$ by each participant is modelled in a similar fashion to [C-1], with the exception that the uncertainty at time k can be a non-diagonal matrix $\Sigma_k$ for the purpose of the soft constraints introduced next in Sec. III-3.

However, for the purposes of illustration, a diagonal matrix $\Sigma_k^p$ is considered to obtain:

$$\mathcal{S}^i(o_k^i, \Sigma_k^i, p_\epsilon) \subset \mathcal{L}(^a\Sigma_k^p + a_{shape}, ^b\Sigma_k^p + b_{shape}) = \mathcal{L}(a_k^i, b_k^i) \tag{9}$$

where $L(a_k^i, b_k^i)$ is an ellipse which conservatively inscribes vehicle i at time k up to an uncertainty $p_\epsilon$. Thus, the set of constraints can be expressed as:

$$g^{i,z}(x_k) > 1, \forall z \in \mathcal{Z}, \tag{10}$$

$$g^{i,z}(x_k) = \begin{bmatrix} x_k^z - x_k^i \\ y_k^z - y_k^i \end{bmatrix}^T R(\phi_k^i)^T \begin{bmatrix} \frac{1}{(a_k^i)^2} & 0 \\ 0 & \frac{1}{(b_k^i)^2} \end{bmatrix} R(\phi_k^i) \begin{bmatrix} x_k^z - x_k^i \\ y_k^z - y_k^i \end{bmatrix}.$$

3) Cost function: The multi-objective cost function is defined for a set of soft constraints $\mathcal{I}$ over the states and controls of the ego, as well as the positions and uncertainty of the other traffic participants. If a soft constraint $\iota \in \mathcal{I}$ is defined via a function $\theta_\iota(x, u, o^{1:n}, \Sigma^{1:n})$, and a weight $\omega_\iota \in \mathbb{R}^+$, the cost function can be defined as:

$$J\left(x_{0:N}, u_{0:N-1}, o_{0:N}^{1:n}, \Sigma_{0:N}^{1:n}\right) = \sum_{k=0}^{N} J_{\mathcal{I}}^k\left(x_k, u_k, o_k^{1:n}, \Sigma_k^{1:n}\right) \tag{11}$$

$$\text{where:} J_{\mathcal{I}}^k\left(x, u, o^{1:n}, \Sigma^{1:n}\right) = \sum_{\iota \in \mathcal{I}} \omega_\iota \theta_\iota\left(x, u, o^{1:n}, \Sigma^{1:n}\right)$$

The weights associated with the soft constraints determine their relative importance. Soft constraints are defined over different objectives:

Progress over a longitudinal goal $x_g : \theta_x = (x - x_g)^2$, a target speed $v_g : \theta_v = (v - v_g)^2$, or for lane tracking under the reference path representation, $\theta_y = y^2$.

Comfort as a minimization of the norm of acceleration, $\theta_a = a^2$, and steering, $\theta_\delta = \delta^2$.

Calculated Risk, defined based on the uncertainty of the other vehicles assuming $$p^i = [x - x^i, y - y^i], \theta_\Sigma = \sum_{k=1}^{n} \frac{1}{|\Sigma^i|} \exp\left(-(p^i)^T (\Sigma^i)^{-1} (p^i)\right).$$

4) NLP formulation: The optimization problem is formulated using the constraints $\mathcal{I}$ and cost J.

Problem 2 (Non-Linear Programming Problem). Given an initial ego state $x_0$, and trajectories of other traffic participants ($o_{0:N}^{1:n}$, $\Sigma_{0:N}^{1:n}$), and the set of soft constraints $\mathcal{I}$, compute the optimal policy:

$$u_{0:N-1}^* = \underset{u_{0:N-1}}{\operatorname{argmin}} \sum_{k=0}^{N} \sum_{\iota \in \mathcal{I}} \omega_\iota \theta_\iota\left(x_k, u_k, o_k^{1:n}, \Sigma_k^{1:n}\right) \text{ s.t.} \tag{12}$$

$\forall k \in \{0, \ldots, N\}$:

$x_{k+1} = f_{\Delta t}(x_k, u_k)$ $|\delta_k| \le \delta_{max}$ $a_{min} \le a_k \le a_{max}$ $|a_{k+1} - a_k| \le \dot{a}_{max}$ $|\delta_{k+1} - \delta_k| \le \dot{\delta}_{max}$ $v_{min} \le v_k \le v_{max}$ $b_l(x_k^z) \le y_k^z \le b_r(x_k^z), z \in \mathcal{Z}$ $g^{i,z}(x_k) > 1, i \in \{1, \ldots n\}, z \in \mathcal{Z}$ Due to the non-linearity of J, $f_{\Delta t}$, $b_l$, $b_r$ and $g^{i,z}$, this problem is a general (equality and inequality constraints) non-linear, non-convex, constrained optimization problem. While it is appealing to solve the problem directly, or using a receding horizon formulation as in [C-1], there are two major challenges to this approach:

Slow and uncertain convergence: solvers for these types of problems are generally slow for large instances, such as Problem 2, particularly when initialization is not carefully considered. While advances in efficient primal-dual interior point solvers have mitigated this issue to a certain degree, the convergence to a solution is uncertain.

Local optima: non-linear constrained optimization solvers tend to be local in nature, finding solutions close to the initial point and, possibly, far from the global optimum.

In the above, the tuple $(x_0, O_{0:n}^{1:N}, \Sigma_{0:n}^{1:N})$ is an example of a set of scenario description parameters, describing a dynamic scenario and a starting state of the ego vehicle within it. The dynamics of the scenario is captured in terms of the motion components of $x_0$, $O_{0:n}^{1:N}$ and $\Sigma_{0:n}^{1:N}$, i.e. the speed and heading dimensions within the NLP formulation.

IV. Two-Step Optimization

Figure 3:
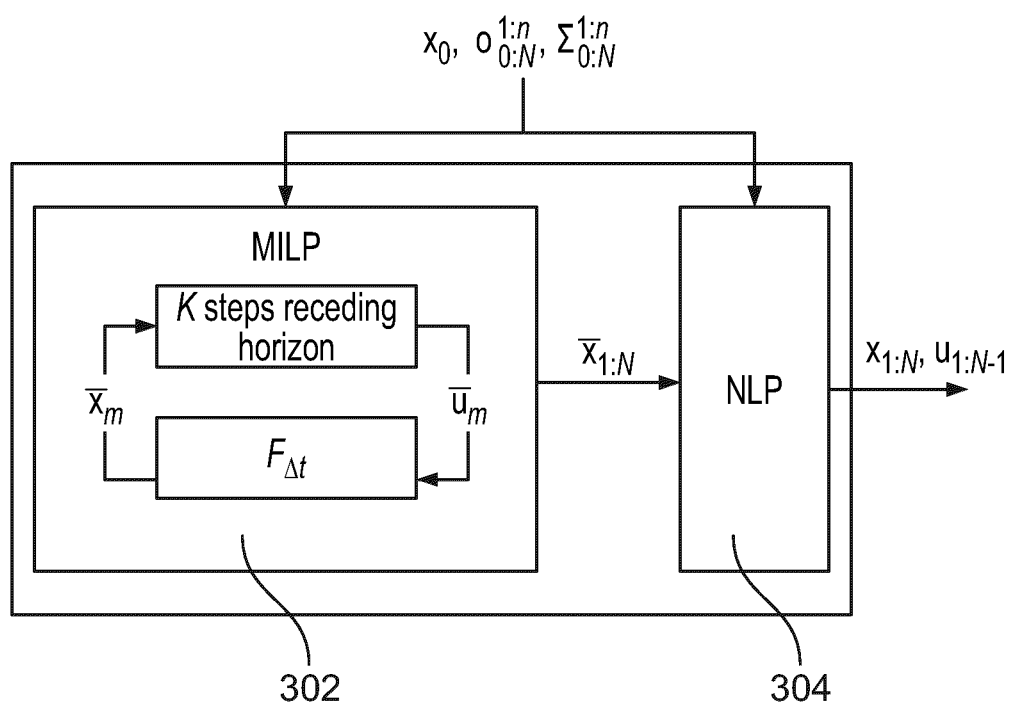
FIG. 3 shows a two-stage constrained optimization architecture.

To mitigate these NLP issues, a framework depicted schematically in FIG. 3 is used.

FIG. 3 shows a two-tier optimization architecture: a first stage 302 corresponds to solving a receding horizon formulation of the linearized version of the problem; in a second stage 304, the problem is solved in a non-linear non-convex constrained optimization fashion using the solution of the first stage as an initialization.

The two stage optimisation of FIG. 3 may be referred to as 2s-OPT.

A motivation behind the architecture is to avoid the local optima convergence in the non-linear, non-convex constrained optimization by providing an initial solution that is closer to the global optimum, which also should lead to faster and more reliable convergence. In the two-tier optimization, the first stage 302 solves a linearized version of Problem 2 in a finite, receding horizon manner using a Mixed Integer Linear Programming (MILP) formulation (details presented in Sec. IV-A). This gives guarantees on the optimality for each stage of the receding horizon problem (see Sec. IV-A5), and, thus, acts as a proxy towards reaching the global optimum of the linearized problem. The second stage 304 uses the output of the MILP optimizer as an initial solution and solves the full Problem 2, as set out above. Given the similar representations of the linearized and non-linear problems, it is expected that this initialization improves convergence, speed and the quality of the final solution.

A. Mixed Integer Linear Programming Formulation

In this stage, Problem 2 is re-formulated as a Mixed Integer Linear Programming optimization problem, with mixed integer linear constraints and a multi-objective cost function.

To do so, a linear vehicle model with kinematic feasibility constraints is considered (Sec. IV-A1). An approach to collision avoidance is formulated which maintains the mixed integer linearity of the model (Sec. IV-A2). In Sec. IV-A3 an interpretation of the soft constraints within the MILP cost function is provided. The full MILP problem in Sec. IV-A4 and discuss the optimality of the solution in Sec. IV-A5.

The following sections make use of the non-linear operators $|\cdot|$, $\max(\cdot)$ and $\min(\cdot)$, which can be enforced in MILP by considering auxiliary binary variables under the "big-M" formulation [C-8], [C-9]. For example, for a constraint $C=\max(A,B)$, assume $b \in \{0,1\}$ to be a binary variable and $M \in \mathbb{R}^+$ to be a sufficiently large value. It is then possible to define the corresponding mixed integer constraints:

$$C \geq A$$

$$C \geq B$$

$$C \leq A + Mb$$

$$C \leq B + M(1-b) \quad (13)$$

Similar definitions can be obtained for the operators $|\cdot|$ and min.

1) Linear Vehicle Model and Kinematic Feasibility: The kinematic bicycle model presented in Sec. Ill-1 is non-linear, but can be linearized around a point using a series expansion. The problem with this approach lies on the fact that this approximation is only valid around the point, yielding higher errors as the distance to the point increases. To avoid this issue, a different vehicle model with nonholonomic constraints is adopted for the first stage 302.

A state of this linear vehicle model at time k is defined as $\bar{x}_k = [x_k\ y_k\ v_k^x\ v_k^y] \in \mathcal{X}^\mathcal{M}$, where $\mathcal{X}^\mathcal{M}$ is the whole state-space for the MILP formulation, with:

$$v_k^x = v_k \cos(\phi_k), v_k^y = v_k \sin(\phi_k) \quad (14)$$

and with controls $\bar{u}_k = [a_k^x\ a_k^y] \in \mathcal{U}^\mathcal{M}$, where $\mathcal{U}^\mathcal{M}$ is the input space for the MILP formulation.

This representation is still based on the reference path $\mathcal{P}_{ref}$, and is the same as the representation used in the second stage 304 in terms of the spatial dimensions. However, whereas the second stage 304 uses an angular representation of motion (i.e. velocity and acceleration are represented in terms of magnitude and angle components), the first stage uses a linear representation of velocity and acceleration.

The linear vehicle dynamics model is defined as:

$$\bar{x}_{k+1} = F_{\Delta t}(\bar{x}_k, \bar{u}_k) = A_d \bar{x}_k + B_d \bar{u}_k \quad (15)$$

where $F_{\Delta t}$ corresponds to a zero-order hold discretization of the continuous state-space system:

$$\dot{\bar{x}} = \begin{bmatrix} 0 & 0 & 1 & 0 \\ 0 & 0 & 0 & 1 \\ 0 & 0 & 0 & 0 \\ 0 & 0 & 0 & 0 \end{bmatrix} \bar{x}^T + \begin{bmatrix} 0 & 0 \\ 0 & 0 \\ 1 & 0 \\ 0 & 1 \end{bmatrix} \bar{u}^T \quad (16)$$

This nonholonomic model is highly simplified when compared to the kinematic bicycle model in (5). To introduce kinematic feasibility, the following constraint is imposed:

$$v^x \geq \rho |v^y|$$

for a given constant $\rho \in \mathbb{R}^+$. Assuming forward motion, that is $$\phi \in \left[-\frac{\pi}{2}, \frac{\pi}{2}\right],$$

this constraint dictates that any movement in the y direction requires motion in the x direction as well.

Similar constraints are imposed as in the non-linear model of the second stage 304, in particular input bounds constraints, $a^x_{min} \leq a^x_k \leq a^x_{max}$ and $a^y_{min} \leq a^y_k \leq a^y_{max}$; jerk related constraints, $|a_{k+1}^x - a_k^x| \leq \Delta a_{max}^x \Delta t$ and $|a_{k+1}^y - a_k^y| \leq \Delta a_{max}^y \Delta t$; and velocity constraints $v^x_{min} \leq v^x_k \leq v^x_{max}$ and $v^y_{min} \leq v^y_k \leq v^y_{max}$, with $v^x_{min} \geq 0$ to guarantee forwards motion.

2) Collision Avoidance: Similarly to the non-linear formulation, collision avoidance is split into avoiding the limits of the road and avoiding other traffic participants. However, a key difference is that the state $\bar{x}$ does not explicitly model the orientation of the vehicle, so linearly approximating the calculation of the corners of the ego vehicle would induce very high errors in the model. Thus, the ego vehicle is considered to be a point $p_k = [x_k, y_k]$ and deal with the area it occupies in the definition of the road limits and other traffic participants. For the driveable space, piecewise-linear functions $b_l^\mathcal{M}(x)$ and $b_r^\mathcal{M}(x)$ are defined for the left and right road boundaries respectively, such that $\forall x: b_l^\mathcal{M}(x) < b_r^\mathcal{M}(x)$. To take the size of the ego vehicle into account, the constraint is formulated as:

$$d + b_l^\mathcal{M}(x_k) \leq y_k \leq b_r^\mathcal{M}(x_k) - d \quad (18)$$

where $d: \mathcal{S}_e \to \mathbb{R}$ is a function of the size of the ego vehicle with respect to its point estimate. In the most conservative case, assuming a rectangular ego vehicle of width w and length l, it is possible to define $d = \sqrt{(w^2 + l^2)}/2$, i.e. reduce the driveable surface to $\mathcal{B} = \mathbb{R}^2 \setminus (\mathcal{B}_{out} \oplus \mathcal{S}_e)$ where $\oplus$ is the Minkowski-sum operator. For practical purposes, $d = w/2$ is considered, which is exact when $\phi = 0$.

For traffic participants, the ellipses $\mathcal{L}(a_k^i, b_k^i)$ defined in (9) are inscribed with axis-aligned rectangles, which are then augmented to consider the point estimate of the ego vehicle's pose. With $d^x$ and $d^y$ being functions of the size of the ego vehicle with respect to its center in the x and y direction, respectively, rectangles $\mathcal{R}_k^i$ are defined with the limits:

$$x_{k,min}^i = \left[\min_x \mathcal{L}(a_k^i, b_k^i)\right] - d^x \quad (19)$$

$$x_{k,max}^i = \left[\max_x \mathcal{L}(a_k^i, b_k^i)\right] + d^x$$

-continued $$y_{k,min}^i = \left[\min_y \mathcal{L}(a_k^i, b_k^i)\right] - d^y$$

$$y_{k,max}^i = \left[\max_y \mathcal{L}(a_k^i, b_k^i)\right] + d^y.$$

It should be noted that $x_{k,min}^i$, $x_{k,max}^i$, $y_{k,min}^i$, $y_{k,max}^i$ can be computed in closed form from $\mathcal{L}(a_k^i, b_k^i)$, $d^x$ and $d^y$.

Then, the collision avoidance constraint is the logical implication:

$$x_{k,min}^i \leq x \leq x_{k,max}^i \wedge y \geq y_{k,min}^i \Rightarrow y \geq y_{k,max}^i \quad (20)$$

which can be understood as "if the ego position is aligned with the vehicle along x, then it must be outside the vehicle's borders in y". The big-M formulation [C-8], [C-9] is used to obtain the following mixed integer constraint:

$$y_{k,max}^i - M\mu_k^i \leq y_k, \quad (21)$$
$$\mu_k^i = \max(x_{k,min}^i - x_k, 0) + \max(x_k - x_{k,max}^i, 0)$$
$$\quad + \max(y_{k,min}^i - y_k, 0)$$

for a sufficiently large $M \in \mathbb{R}^+$.

3) *Mixed Integer Linear Cost Function*: For best performance, the cost function of the MILP stage 302 should be similar to the cost function from the non-linear stage 304 to minimize the gap between the optimum obtained in both stages.

If the cost functions are similar, and subject to similar constraints, then the optimal trajectory computed in the first stage 302 should approximate the final optimal trajectory computed in the second stage 304, and therefore provide a useful initialization.

The MILP problem is defined in a receding horizon formulation, in which the cost over each state (individual cost) is also defined independently in time, with:

$$J_C^{M,k}(\bar{x}, \bar{u}, o^{1:n}, \Sigma^{1:n}) = \sum_{\iota \in C} \Omega_\iota \Theta_\iota(\bar{x}, \bar{u}, o^{1:n}, \Sigma^{1:n}), k \in \{0, \ldots, N\} \quad (22)$$

for a set of soft constraints $\mathcal{C}$, where each constraint $\iota$ is defined by a function $\Theta_\iota(\bar{x}, \bar{u}, o^{1:n}, \Sigma^{1:n})$ and its weight $\Omega_\iota \in \mathbb{R}^{+|\mathcal{C}|}$. The weights determine the relative importance of each constraint and can be fine-tuned to optimize performance.

Similarly to the non-linear stage 304, soft constraints are defined over different objectives:

Progress over a longitudinal goal $x_g$, $\Theta_x = |x - x_g|$; over a target speed $v_y$, $\Theta_v = |v - v_g|$; and over lane tracking, $\Theta_y = |y|$.

Comfort as a minimization of the norm of lateral acceleration, $\Theta_a = |a_y|$.

Calculated Risk using the big-M formulation, with $w^+$ and $l^+$ being the values to the added to the width and length of each $R^i$ based on different risk levels, defined for $i \in \{1, \ldots, n\}$:

$$\xi^i = \max((x_{min}^i - l^+/2) - x, 0) + \max(x - (x_{max}^i + l^+/2), 0)$$

with the auxiliary constraints:

$$\eta^i \leq \frac{2|y - y^i|}{w^+} \quad (23)$$

$$\max(1 - \eta^i, 0) - M\xi^i \leq \bar{\theta}_\Sigma^i$$

$$\max(1 - \eta^i, 0) + M\xi^i \geq \bar{\theta}_\Sigma^i,$$

such that minimizing risk corresponds to minimizing the function $\Theta_\Sigma = \Sigma_{i=1}^n \bar{\theta}_\Sigma^i$.

4) *MILP Problem Definition*: With constraints $\mathcal{C}$ and cost function $J_C^{M,k}$, the planning problem of the first stage 302 is formulated as a MILP problem with a receding horizon of K steps.

In the end, a full trajectory $\bar{x}_{0:N}$ of length N+1 is obtained at the first stage 302, to initialize the second stage 304. However, the receding horizon approximation iteratively breaks the problem down into a set of simpler optimization problems, each defined over K<N steps. In each iteration a "cost component" of the full cost function is defined as the sum of the individual costs over only K steps, as set out below.

Problem 3 (Receding Horizon MILP). Given an initial ego state $x_0$, trajectories of other traffic participants ($o_{0:N}^{1:n}$, $\Sigma_{0:N}^{1:n}$), a set of soft constraints $\mathcal{C}$, and planning step (iteration) $0 \leq m \leq N-K$ of the receding horizon, compute the optimal policy:

$$\bar{u}_{m:m+K-1}^* = \underset{\bar{u}_{m:m+K-1}}{\operatorname{argmin}} \sum_{k=m}^{m+K} \sum_{\Theta_\iota, \Omega_\iota \in C} \Omega_\iota \Theta_\iota(\bar{x}_k, \bar{u}_k, o_k^{1:n}, \Sigma_k^{1:n}) \quad (24)$$

s.t. $\forall k \in \{m, \ldots, m+K\}$:

$$\bar{x}_{k+1} = F_{\Delta t}(\bar{x}_k, \bar{u}_k)$$
$$a_{min}^x \leq a_k^x \leq a_{max}^x$$
$$a_{min}^y \leq a_k^y \leq a_{max}^y$$
$$|a_{k+1}^x - a_k^x| < \Delta a_{max}^x \Delta t$$
$$|a_{k+1}^y - a_k^y| < \Delta a_{max}^y \Delta t$$
$$v_{min}^x \leq v_k^x \leq v_{max}^x$$
$$v_{min}^y \leq v_k^y \leq v_{max}^y$$
$$v^x \leq \rho|v^y|$$
$$d + b_l^M(x_k) \leq y_k$$
$$y_k \leq b_r^M(x_k) - d$$
$$y_{k,max}^i - M\mu_k^i \leq y_k, i \in \{1, \ldots, n\}$$

For planning step m=0, the known initial vehicle state $\bar{x}_0$ is used as a starting point, with subsequent states determined by applying the vehicle dynamics model $F_{\Delta t}$ in an iterative fashion. For each subsequent planning step, the state $\bar{x}_{m-1}$ determined in the previous planning step m−1 provides a starting point for that iteration, with subsequent states computed from that starting point in the same way.

In both the MILP and the NLP stages, optimization occurs in the continuous space; no spatial/grid discretization occurs at either of the stages. In particular, in the MILP stage, the state vectors of both the ego vehicles and the other actors, and control vectors are not restricted to integer values, or otherwise discretised to any fixed grid. Not discretizing over a grid is one of the advantages of the method, as it allows for smoother trajectories.

The integer variables in the MILP stage are used to enforce the constraints related to collision avoidance and driveable surface only.

The trajectory $\bar{x}_{0:N}$ computed in the MILP optimization stage 302 is an example is a "seed trajectory", as that term is used herein, whereas the trajectory $x_{0:N}$ computed in the NLP optimization stage 304 (derived, in part, from the seed trajectory $\bar{x}_{0:N}$), is an example of a "final" trajectory. The trajectory is "final" within the specific context of the two-stage optimization. The term "final" does not necessarily imply finality within the context of the runtime 100 stack as a whole. The final trajectory $x_{0:N}$ may or may not be subject to further processing, modification etc. in other parts of the runtime stack 100 before it is used as a basis for generating control signals within the controller 108.

Consistent with the above terminology, the linear cost function of Equation (22) and the linear dynamics model of Equations (15) and (16) are examples of a "preliminary" cost function and model respectively, whilst the non-linear cost function of Equation (11) and the non-linear dynamics model of Equation (5) are examples a "final" or, equivalently, "full" cost function and model respectively, where the terms "final" and "full" are, again, only used in the specific context of the two-stage optimization, and does not imply absolute finality.

It is noted that, which the above paragraph considers seed and final trajectories, it could be that the control actions $\bar{u}_{0:N-1}$ of the MILP stage 302 are alternatively or additionally used to seed the NLP stage 304 (and they may be referred to as seed control actions in that event); similarly, as noted above, data of one or both of the final trajectory $x_{0:N}$ and the final series of control actions $u_{0:N-1}$ may be provided to the controller 108 for the purpose of generating "actual" control signals for controlling the autonomous vehicle.

Whereas in the NLP stage 304, the scenario description parameters $(x_0, O_{0:n}^{1:N}, \Sigma_{0:n}^{1:N})$ have a non-linear form (because they are formulated in terms of heading $\phi_k$), in the MILP stage 302, the scenario description parameters $(x_0, O_{0:n}^{1:N}, \Sigma_{0:n}^{1:N})$ have a linear form (because motion is formulated in terms of components $v_k^x, v_k^y$ instead of speed and heading $v_k, \phi_k$), with $\bar{x}_0$ denoting the linearized form of the ego vehicle state specifically.

Regarding notation, $\bar{x}_{0:N}$ and $x_{0:N}$ are used as shorthand to represent complete trajectories, including the (known) current state $x_0$. The additional states actually determined in the relevant optimization stage 302, 304 are $\bar{x}_{1:N}$ and $x_{1:N}$, as depicted in FIG. 3.

Figure 4:
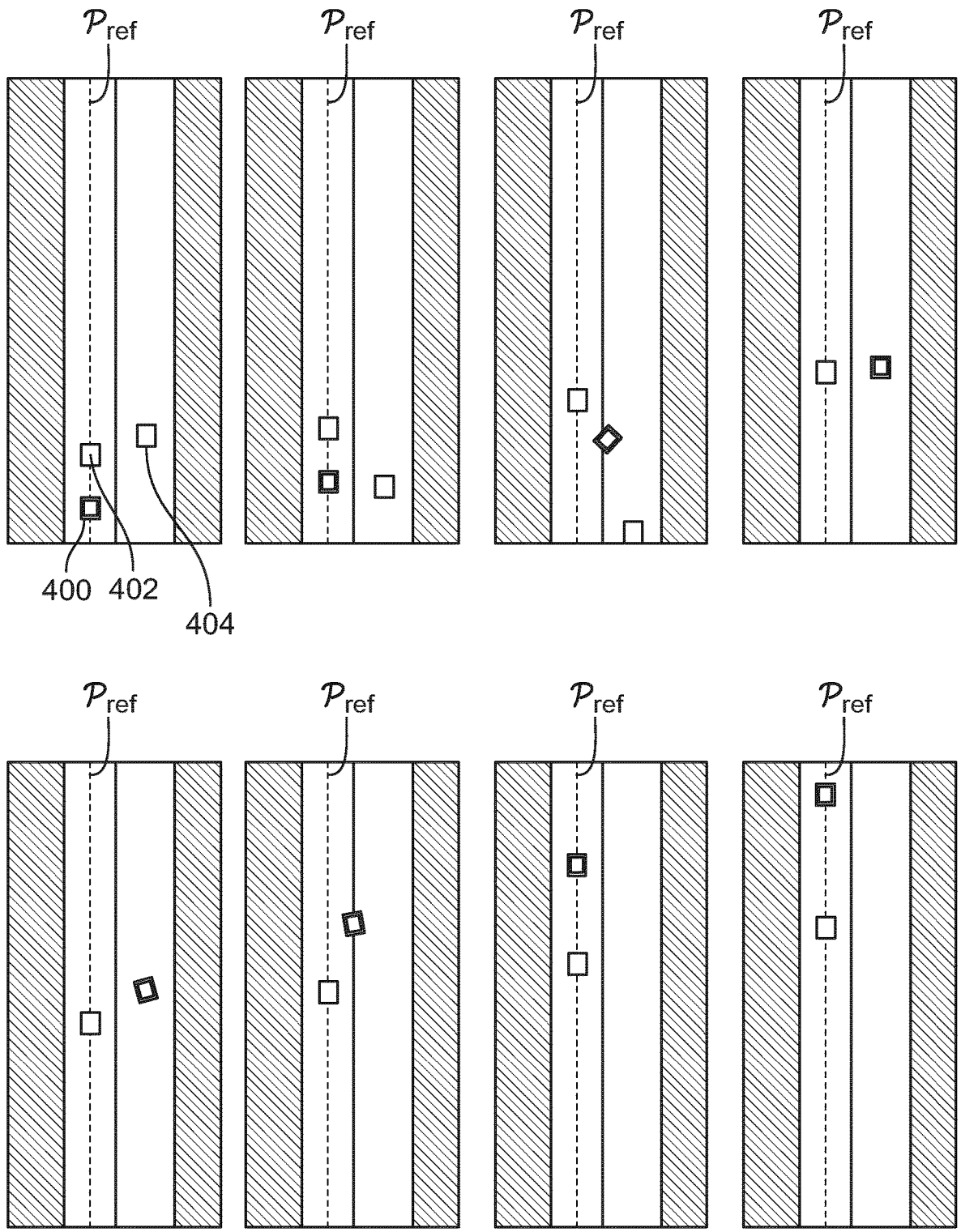
FIG. 4 schematically depicts an example trajectory.

FIG. 4 shows, by way of example, one example of a possible trajectory over eight time steps (k=0 to 7). This corresponds to an overtaking maneuver, in which an ego vehicle 400 desired to overtake a forward vehicle 402 in the presence of an oncoming vehicle 404. Both the forward vehicle and the on-coming vehicle are traffic participants (obstacles), modelled in the manner above.

It will be appreciated that the duration $\Delta t$ between time steps in FIG. 4 has been chosen for the purpose of illustration, in order to show the whole manoeuvre, and would not necessarily reflect the duration that would be applied in real-life.

An overtaking goal is defined by way of a suitably distant reference location (not shown) on the reference path $\mathcal{P}_{ref}$ ahead of the forward vehicle 402. The effect of the progress constraints is to encourage the ego vehicle 400 to reach that reference location as soon as it can, subject to the other constraints, whilst the effect of the collision avoidance constraints is to prevent the ego vehicle 402 from pulling out until the oncoming vehicle stops being a collision risk.

Figure 5:
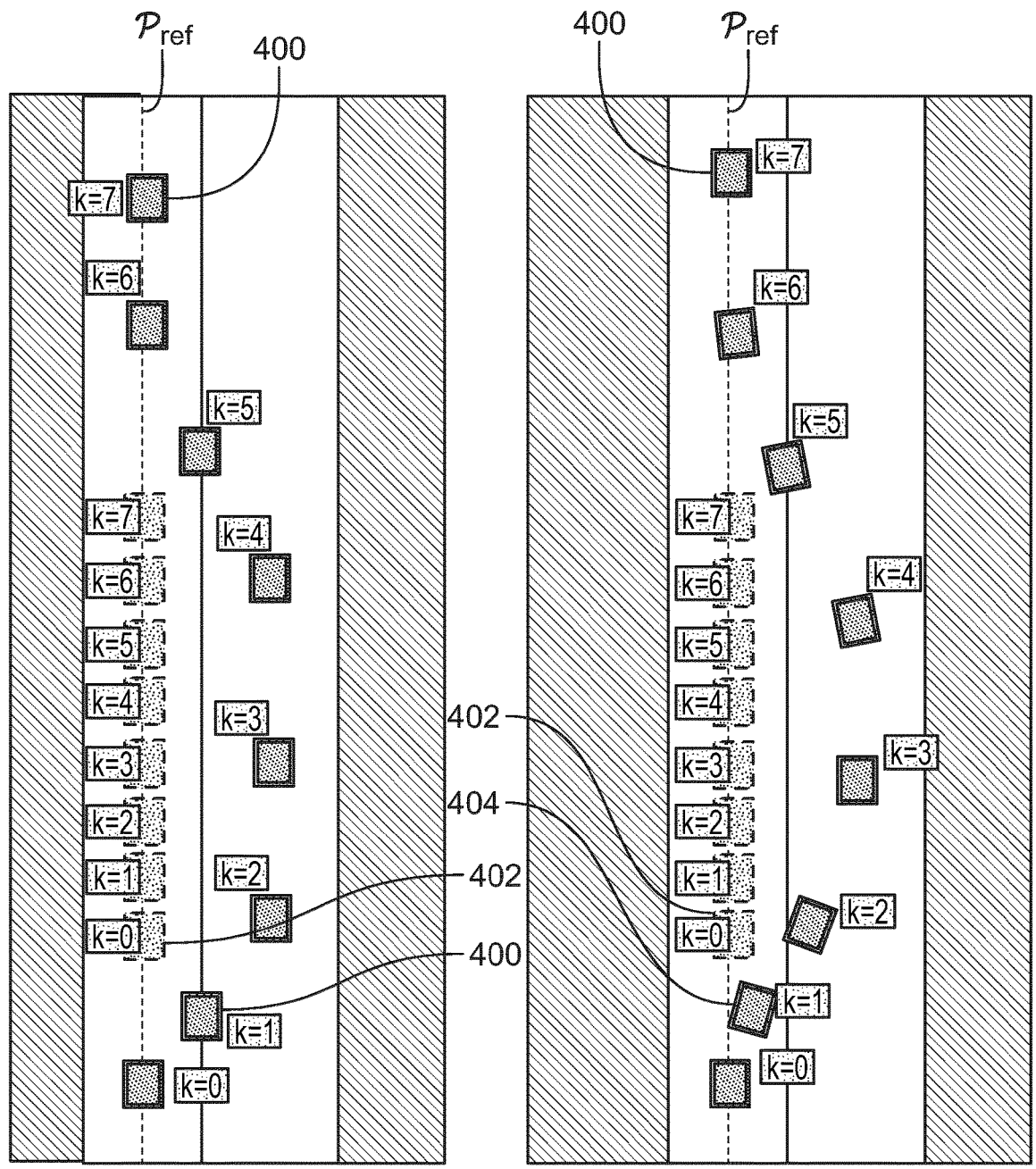
FIG. 5 shows a comparison of example trajectories in first and second optimization stages respectively.
Figure 5:
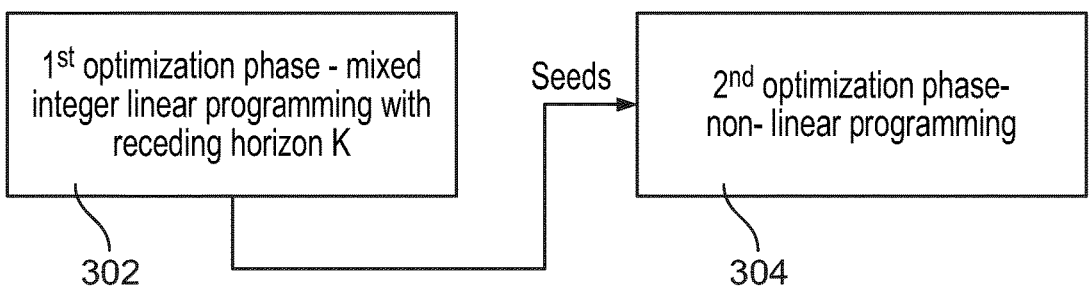

FIG. 5 shows how such a problem might be formulated in the two-stage approach. Shading is used to show the ego vehicle 400 and the forward vehicle 402 at different timesteps k=0, . . . , 7 (For the sake of simplicity, the scenario of FIG. 5 is slightly different than of FIG. 4, in that it omits the oncoming vehicle 404).

On the left-hand side, FIG. 5 illustrates some of the principles underlying the MILP formulation of the first stage 302.

As can be seen on the left-hand side of FIG. 5, the ego vehicle 400 remains axially aligned (i.e. aligned with the reference path $\mathcal{P}_{ref}$) at all times. This reflects the simpler, linear dynamics model that is used in the MILP stage—as can be seen from Equations (15) and (16) above, the simpler dynamics model does not consider rotation of the ego vehicle 200 (recall that the MILP stage uses a linear representation of velocity and acceleration). Hence, the output of the first stage 302 is a more "restricted" form of trajectory defined in terms of linear position and velocity but not orientation/heading of the ego vehicle 200. The linearized trajectory may not be fully dynamically realisable, but nevertheless serves as a useful initialization to the second stage 304.

By contrast, as shown on the right-hand side of FIG. 5, the form of the trajectory planned in the second stage 304 is not restricted in the same way the first stage 302. This is because the full problem takes into account steering angle and heading of the ego vehicle 200. That is, the solution to Problem 2 is free to consider motion of the ego vehicle 400 that does not meet the discretisation restrictions applied in the first stage 302.

5) On the optimality of the MILP formulation: The goal of the formulation of Problem 3 is to obtain an optimal solution which can be used as initialization to Problem 2 to minimize the problems of slow convergence and local optima that arise from solving the NLP directly. In this section, the optimality of the solution to Problem 3 is discussed.

A solution to Problem 3 can be obtained using Branch and Bound, a divide and conquer algorithm first introduced and applied to mixed integer linear programming by Land and Doig in [C-10]. This solution is proven to be the globally optimal one [C-7], [C-11]. In practice, modern solvers (e.g. Gurobi or CPLEX) may fail to find the global solution due to rounding errors and built-in tolerances [C-11]. On top of this, the receding horizon formulation of the problem, introduced for the sake of computational tractability, generates suboptimality by definition [C-12], [C-13]. Due to these factors, no strong theoretical guarantee can be given regarding the solution of the MILP stage. However, despite the lack of theoretical guarantees at this level, a solution that is close to the global optimum at each receding horizon step acts as a proxy towards a final solution to be obtained in the second stage 304 that is close to the global optimum and, in turn, initializing the NLP stage using this solution is expected to improve the quality of the solution at that second stage 304.

In some contexts, it may be that the speed increase provided by the two-stage approach will admit direct application on an autonomous vehicle in real-time.

However, to provide an additional speed increase, which may be needed to ensure real-time performance in a resource-constrained environment, it is also possible to implement an approximation of one or both of the first and second stages 302, 304, using a trained function approximator, such as a neural network.

Either one or both of the first and second stages 302, 304 could be replaced with a function approximator in a practical implementation.

Figure 6:
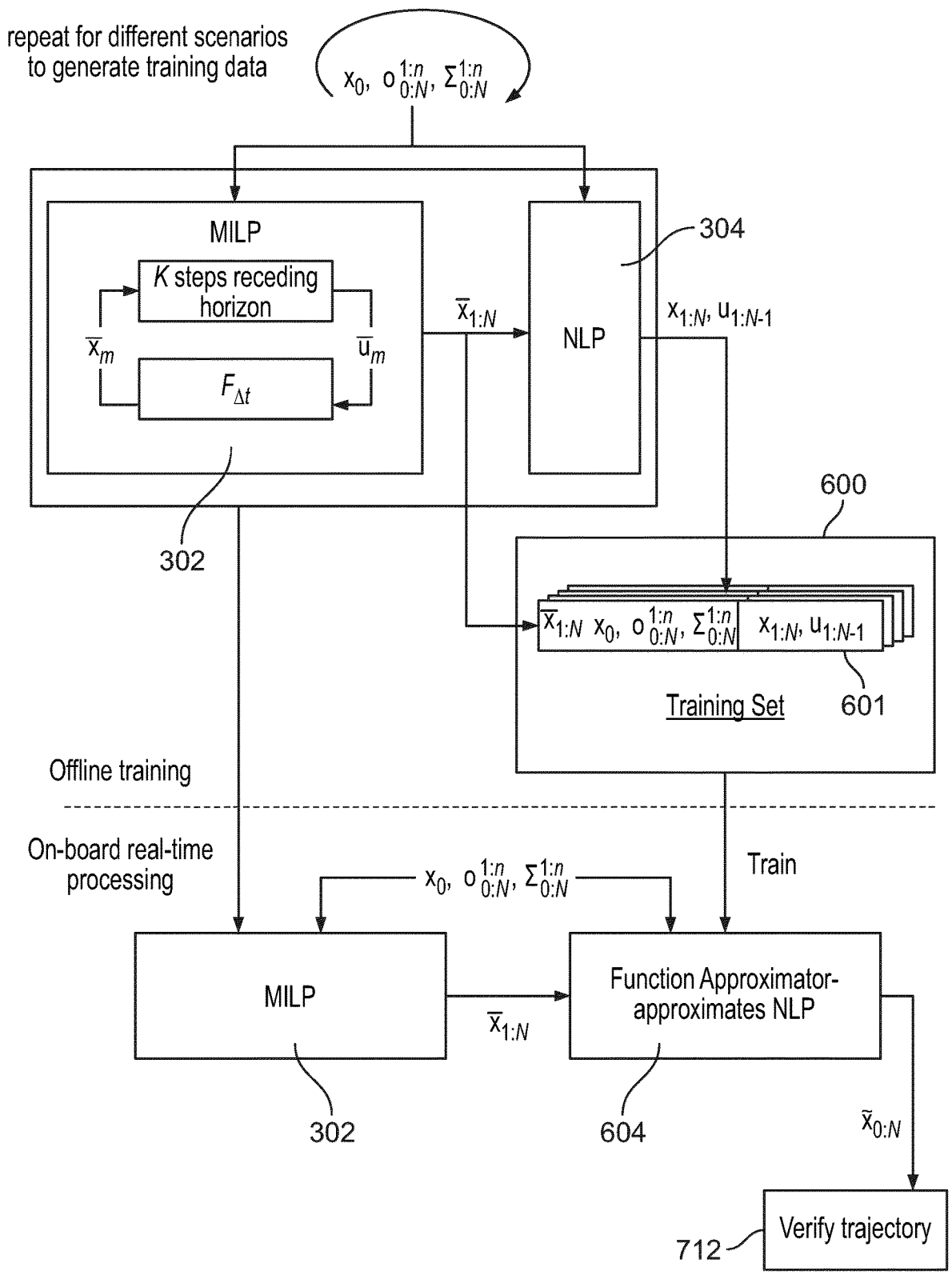
FIG. 6 shows how a function approximator may be trained to approximate a NLP constrained optimization stage.

By way of example, the following section describes, with reference to FIG. 6, an example of how the non-linear second stage 304 might be with a trained function approximator.

FIG. 6 shows how the two-stage optimization can be run repeatedly, in an offline context (e.g. in an off-board training computer system), for different scenarios, for the purpose of generating an NLP training set 600. In this case, each input in the NLP training set 600 corresponds to an initialization output generated by the first stage optimizer 302 on a given scenario, and a ground truth label for that inputs is given by the output of the second stage optimization 304 on that training scenario. Within this framework, the NLP optimization stage 304 is treated as a function that takes the initialization output of the first stage 302, and transforms it to a desired control output (corresponding the optimal trajectory solving Problem 2). With a sufficiently large NLP training set 600, a function approximator 304 can be trained to approximate this function of the NLP optimization stage 304. The trained function approximator 604 (which may be referred to as the NLP approximator 602) can, in turn, be implemented on-board the vehicle 400, rather than attempting to perform the full non-linear optimization of the second stage 304 on-board the vehicle in real-time.

Each training example 601 of the NLP training set is made up of an input, which in turn comprises a particular set of scenario description parameters $(x_0, O_{0:n}^{1:N}, \Sigma_{0:n}^{1:N})$ together with a corresponding seed trajectory $\bar{x}_{0:N}$ (i.e. as computed in the MILP stage 302 for the corresponding scenario description parameters), and a corresponding ground truth, which in this case is a corresponding final trajectory $x_{0:N}$ as computed in the NLP stage 304 for the corresponding input.

Once trained, given such an input, i.e. a set of scenario description parameters $(x_0, O_{0:n}^{1:N}, \Sigma_{0:n}^{1:N})$ and a seed trajectory $\bar{x}_{0:N}$ (as computed in an online instantiation of the MILP phase 302 in this example), the NLP approximator 900 computes a corresponding final trajectory $\tilde{x}_{0:N}$ which will approximate a full NLP solution $x_{0:N}$ that would be obtained from the full NLP optimization ($x_{0:N}$ may be referred to as the exact final trajectory in this context). Because the NLP stage 304 is now approximated, it will not necessarily be guaranteed that the approximate final trajectory $\tilde{x}_{0:N}$ will meet the hard NLP constraints of Problem 2 above (i.e. the hard constraints on which the NLP approximator 604 has been trained). Therefore, a trajectory verification component 702 is provided, whose function is to verify the approximate final trajectory $\tilde{x}_{0:N}$ against the hard NLP constraints (i.e. the constraints as set out above in relation to Problem 2), or some practical variant of the hard NLP constraints (e.g. the NLP approximator 712 could be trained "conservatively" on somewhat more stringent hard constraints than the constraints the approximate final trajectory $\tilde{x}_{0:N}$ is actually required to satisfy, in order to reduce instances in which the approximate final trajectory $\tilde{x}_{0:N}$ fails the actual hard constraints imposed by the trajectory verification component 712). That is to say, the trajectory verification component 712 verifies the approximate final trajectory $\tilde{x}_{0:N}$ against a set of trajectory verification constraints, which may or may not be identical to the NLP constraints of Problem 2.

If the approximate final trajectory $\tilde{x}_{0:N}$ satisfies the trajectory verification constraints, it can be passed to the controller 108 to implement. In the case that the approximate final trajectory fails to satisfy at least one of the trajectory verification constraints, then it can modified, either at the planning level (by the planner 106) or control level (by the controller 108) so that it does. Assuming the NLP approximator 702 has been adequately trained such modifications, if required, should generally be relatively small.

The different scenarios could, for example, be simulated scenarios, generated in a simulator.

Figure 7:
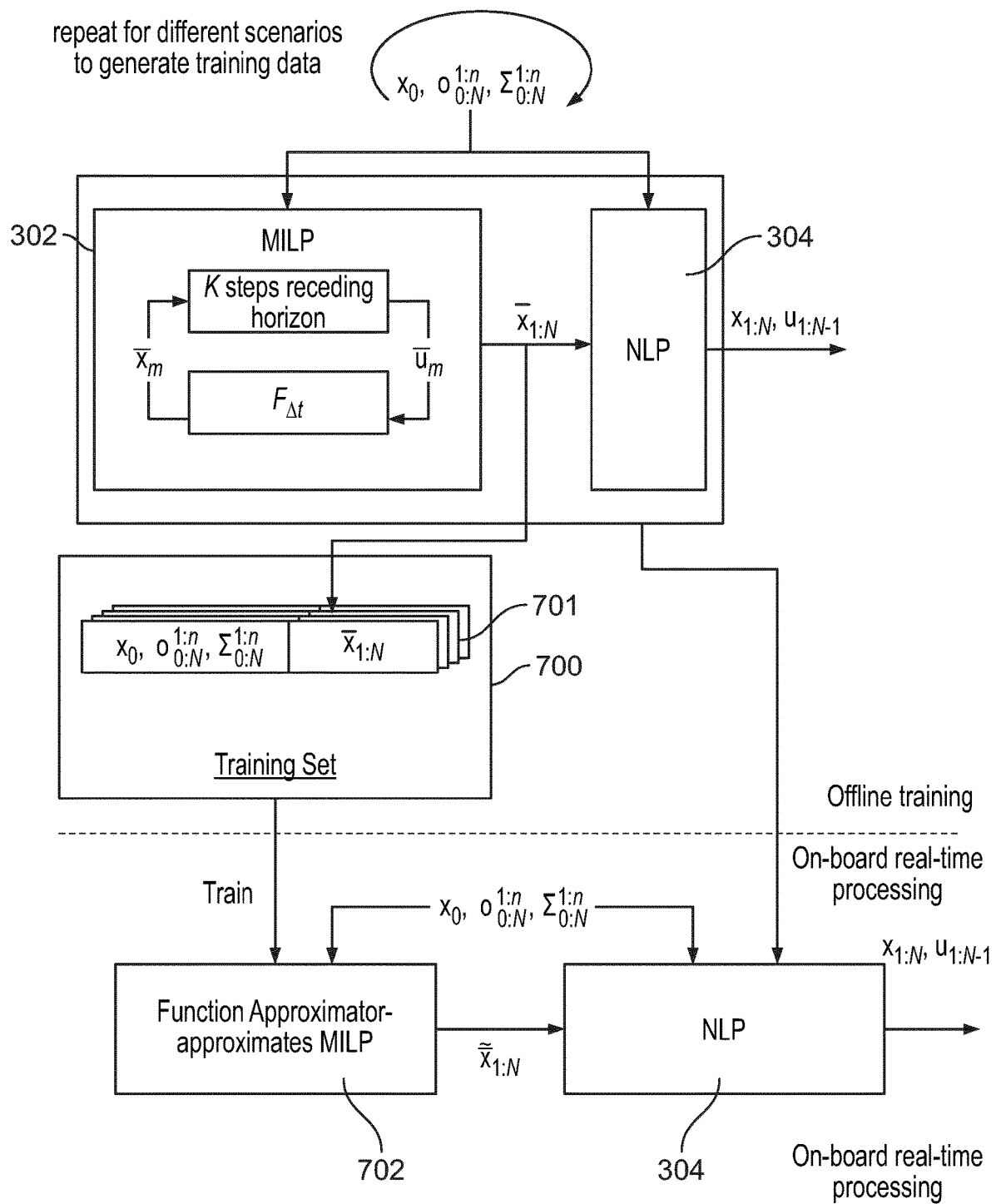
FIG. 7 shows how a function approximator may be trained to approximate a MILP constrained optimization stage.

FIG. 7 shows how a similar approach may be adopted to approximate the MILP stage 302 online. The same principles apply, however in this case, a MILP training set 700 is created through repeated applications of the MILP optimizer on different scenarios, and each training example 701 of the MILP training set 700 is made up of an input in the form of particular set of scenario description parameters $(x_0, O_{0:n}^{1:N}, \Sigma_{0:n}^{1:N})$ (mirroring the input to the MILP stage 302) and a corresponding ground truth, which is now the corresponding seed trajectory $\bar{x}_{0:N}$ (i.e. as obtained for the corresponding input parameters in the MILP stage 302).

That is to say, whereas the seed trajectory $\bar{x}_{0:N}$ forms part of the input of each training example 601 of the NLP training set 600 of FIG. 6 (with the full trajectory $x_0$ providing the ground truth), in the MILP training set 700 of FIG. 7, the seed trajectory $\bar{x}_{0:N}$ now provides the ground truth.

The same principles generally apply, but now a function approximator 702 is trained on the MILP training set 700 to approximate the MILP stage 602. Such a trained MILP approximator 702 can then be used in online processing to compute an approximate seed trajectory $\tilde{\bar{x}}_{0:N}$ given a set of online scenario description parameters $(x_0, O_{0:n}^{1:N}, \Sigma_{0:n}^{1:N})$, and the approximate seed trajectory $\tilde{\bar{x}}_{0:N}$ can, in turn, be used to initialize an online instantiation of the NLP stage 304. In this example, the full NLP stage 304 is implemented, and the trajectory verification component 712 is therefore not required.

Regarding notation, $\tilde{x}_{0:N}$ and $\tilde{\bar{x}}_{0:N}$ are used as shorthand to represent complete trajectories, including the current state $x_0$. The states actually determined by the relevant function approximator are $\tilde{x}_{1:N}$ and $\tilde{\bar{x}}_{1:N}$. Certain figures show $\tilde{x}_{0:N}$ and $\tilde{\bar{x}}_{0:N}$ as an output of a function approximator. It will be appreciated that this is a shorthand decision of the computed states $\tilde{x}_{1:N}/\tilde{\bar{x}}_{1:N}$ (as applicable), together with the known initial state $x_0$ provided as an input to the system. This also applies to FIGS. 8 and 9 (see below).

Figure 8:
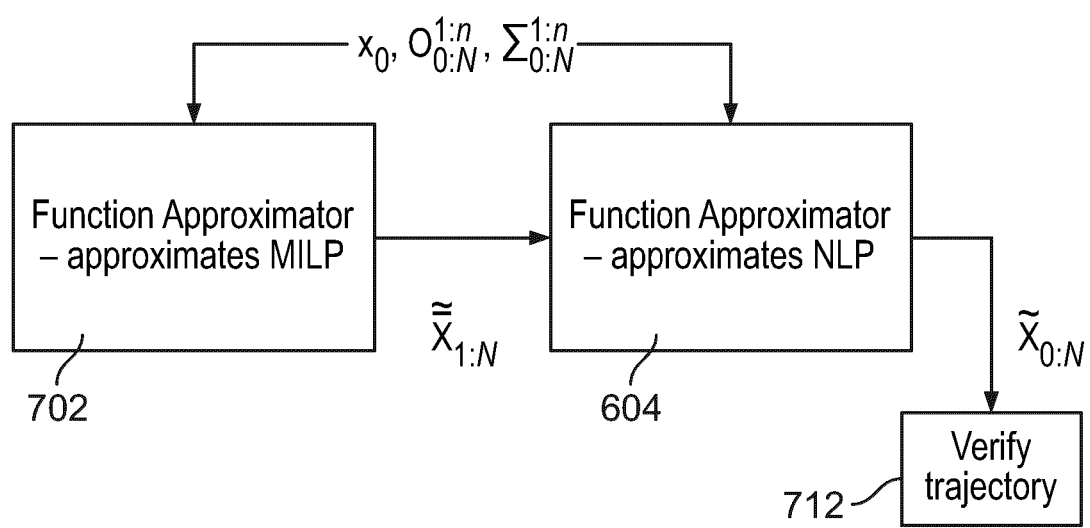
FIG. 8 shows an online planner comprising first and second function optimizers which have been trained to approximate a two-stage constrained optimization process.

FIG. 8 shows an example of an implementation in which the MILP stage 302 and the NLP stage 304 are both approximated. In this case, the MILP approximator 702 of FIG. 7 is used to seed the NLP approximator 604 of FIG. 6, i.e. an approximate seed trajectory $\tilde{\bar{x}}_{0:N}$ forms an input to the NLP function approximator 604, which in turn is used in deriving an approximate full trajectory $\tilde{x}_{0:N}$. The trajectory verification component 712 is used, as in FIG. 6, to verify the approximate full trajectory $\tilde{x}_{0:N}$.

Figure 9:
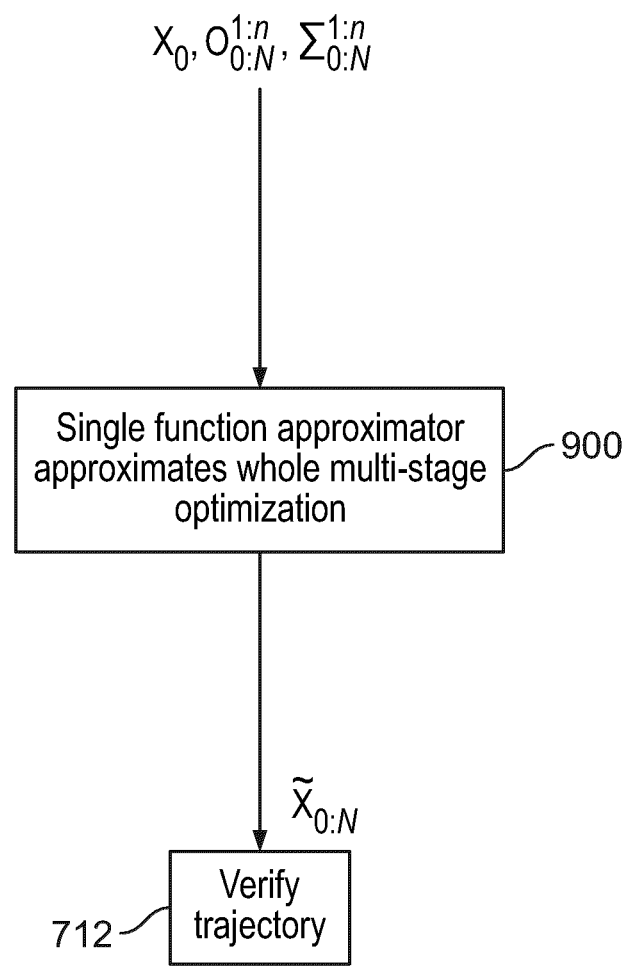
FIG. 9 shows a single function approximator trained to approximate a multi-stage constrained optimization process.

FIG. 9 shows another example implementation, in which a single function approximator 900 is trained to approximate both optimization stages 302, 304. In this case, the function approximator 900 takes, as input, a set of scenario description parameters, and directly computes an approximate full trajectory $\tilde{x}_{0:N}$. The single approximator 900 would be trained on training examples whose inputs are scenario description parameters and whose ground truths are provided by the corresponding full NLP trajectories. A trajectory verification component 732 is similarly used in this case to verify the output of the single function approximator 900.

Note that the term "approximate" is used herein in two somewhat distinct senses. When a function approximator is used to approximate the MILP stage 302 and/or the NLP stage 304, the MILP/NLP function approximator 302/304 is said to approximate the seed trajectory $\bar{x}_{0:N}$/final trajectory $x_{0:N}$ as applicable (i.e. the output of the trained MILP approximator 702, $\bar{\bar{x}}_{0:N}$, is said to be an approximation of the exact seed trajectory $\bar{x}_{0:N}$ that would be derivable via the full MILP optimization; likewise, the output of the trained NLP approximator 704, $\sim x_{0:N}$, is said to be an approximation of the exact final trajectory $x_{0:N}$ that would be obtained via the full NLP optimization).

The seed trajectory $\bar{x}_{0:N}/\bar{\bar{x}}_{0:N}$ (whether exact or approximate in the sense of the preceding paragraph) is also said to approximate the full trajectory $X_{0:N}/\tilde{x}_{0:N}$ (whether exact or approximate in the sense of the preceding paragraph). The exact or approximate seed trajectory $\bar{x}_{0:N}/\bar{\bar{x}}_{0:N}$ may be a relatively coarse approximation of the exact or approximate final trajectory $x_{0:N}/\tilde{x}_{0:N}$. A relatively coarse approximation in this context is perfectly acceptable, because even a coarse seed trajectory (i.e. $\bar{x}_{0:N}$ or $\bar{\bar{x}}_{0:N}$) can have the desired effect of guiding the NLP optimization toward globally a optimal solution (and away from mere local optima). In this same sense, the linear cost function of Equation (22) approximates the non-linear cost function of Equation (11) and the linear dynamics model of Equations (15) and (16) approximates the non-linear dynamics model of Equation (5).

Note that, whilst the description of FIGS. 6 to 9 assumes that the various components operates on trajectories $\bar{x}_{0:N}$ or $\bar{\bar{x}}_{0:N}$, they could, alternatively or additionally, operate on the control actions computed at the various optimization/approximation stages, i.e. each approximator 602, 704 could alternatively or additionally be trained to determine an approximate series of seed control actions $\bar{\bar{u}}_{0:N-1}$ (approximating those of the MILP stage 302) and/or an approximate series of final control actions (approximating those of the NLP stage 304—and which could in turn form (part of) or be used to derive the input to controller 108). The same applies to the single approximator of FIG. 9, which could alternatively or additionally compute $\tilde{u}_{0:N-1}$ directly from the scenario description parameters.

The above techniques be implemented in an "onboard" or "offboard" context. One example of an offboard context would be the above training performed in an offboard computer system. The above techniques can also be implemented as part of a simulated runtime stack in order to test the performance of the runtime stack in a simulator. Simulation is an increasingly crucial component of safety and other performance testing for autonomous vehicles in particular.

Note, where a function approximation approach is used, the function approximator(s) can be tested in the simulator, in order to assess their safety and performance before they are deployed on an actual vehicle.

V. Pilot: Efficient Planning by Imitation Learning and Optimisation for Safe Autonomous Driving The term "PILOT" (Planning by Imitation Learning and Optimisation) is used herein to refer to a runtime planner, in which a trained function approximator—trained via imitation learning—seeds (initializes) a runtime optimizer. A PILOT planner could be implemented in the architecture of FIG. 7.

As another example, a PILOT planner could be implemented the architecture of FIG. 8 or FIG. 9, in which the verification component 712 also takes the form of a runtime optimizer.

In the examples described below, the architecture of FIG. 9 is used, i.e. a single function approximator 900 is trained to imitate both the MILP and NLP stages 302, 304, and the verification component 712 is implemented using the same logic as the NLP stage 304, i.e. the functionality described in section III is implemented in two contexts—firstly, as part of the process to generate training data for the single function approximator 604, and secondly to refine an initial trajectory provided by the trained function approximator 900 at runtime.

The same applies to the alternative architecture of FIG. 7—in that case, the NLP logic would be applied to generate the training data for the second function approximator 604, and also at runtime to implement the verification component 712.

A significant benefit PILOT architecture is that, not only can it provide high-quality solutions by avoiding convergence to local optima, it can do so in real-time, even on a resource-constrained platform such as an autonomous vehicle or other mobile robot computer system.

Achieving the right balance between planning quality, safety and run-time efficiency is a major challenge for autonomous driving research. With PILOT, a neural network component efficiently imitates an expensive-to-run optimisation-based planning system to enforce a baseline of planning quality, and an efficient optimisation component with a similar objective function to the expert that refines the network output to guarantee satisfaction of requirements of safety and passenger comfort. In simulated autonomous driving experiments, it has been demonstrated that the proposed framework achieves a significant reduction in runtime when compared to the optimisation-based expert it is based on, without sacrificing the output quality.

V.1 Introduction

Guaranteeing safety of decision making is a fundamental challenge in the path towards the long-anticipated adoption of autonomous vehicle technology. Attempts to address this challenge show the diversity of possible definitions of what safety means: whether it is maintaining the autonomous system inside a safe subset of possible future states [D-1], [D-2], preventing the system from breaking domain-specific constraints [D-3], [D-4], or exhibiting behaviours that match the safe behaviour of an expert [D-5], amongst others.

Typically, model-based approaches to safety are engineering-heavy and require deep knowledge of the application domain, while, on the other hand, the hands-off aspect of the data-driven approach is lucrative, hence the growing interest in the research community in exploiting techniques like imitation learning for autonomous driving [D-6], [D-7], [D-8], [D-9]. Moreover, inference using a data-driven model is usually very efficient compared to, e.g., more elaborate search- or optimisation-based approaches.

From a different angle, model-based planning approaches give a better handle on understanding system expectations through model specification and produce more interpretable plans [D-10], [D-11], [D-12], but usually at the cost of robustness [D-13] or runtime efficiency [D-4].

A simplistic attempt to leveraging learning from data in this setting (e.g. a vanilla behavioural cloning approach to imitation learning [D-14]), will likely fail to exhibit safe behaviour at deployment time due to covariate shift between the situations in the specific training data and the deployment environment [D-15], [D-16], even with a prohibitive amount of training data. Attempts to improve deployment time performance include online approaches to training that actively enrich the training data with actual experiences of the learner in the deployment environment [D-17], and offline approaches that synthesise realistic perturbed traces from the original expert dataset to include more failure cases and near-misses [D-18].

Still, in a safety-critical application like autonomous driving, exhibiting safe behaviour is not sufficient. As pure data-driven approaches struggle to certify the safety of their output at deployment time, approaches that leverage data-driven methods along with additional components that give some guarantees on the safety of the output have emerged, e.g., using control safe sets to validate acceleration and steering commands predicted by a neural network [D-19].

The embodiments described below follow the imitation learning paradigm, but instead of depending on curated, human expert data in a learning scheme, imitate traces are generated by a performant planner (referred to as the base, reference or expert planner) that is expensive-to-run. Taken as the expert, a data-driven, imitation learning technique is utilized to produce an efficient neural planner—when compared to the expert planner—that maintains its standard of planning quality. This imitation learning paradigm takes full advantage of the base planner without introducing superficial limits to its sophistication. This is in contrast to approaches like Constrained Policy Nets [D-20] in which the cost function of an optimisation planner is made into a loss signal to train a policy network from scratch, requiring careful treatment of the constraint set.

The imitation learning approach taught herein is generally applicable, and can be used to approximate any desired reference planner. The following examples use the two-stage optimisation approach of FIG. 3 as the base planner, which produces high-quality plans by solving two consecutive optimisation problems but struggles in runtime efficiency. However, it will be appreciated that the description applies equally to any reference planner.

In this context, a benefit of the multi-stage optimization-based architecture of FIG. 3 is that better solutions can be achieved at the expense of increased computing resources (i.e. there is a direct relationship between the resources allocated to the planner and the quality of the final trajectories it produces). The non-real-time expert planner provide high quality expert trajectories, which can then be used to train a real-time planner (e.g. neural network-based) via imitation learning.

The following examples use an in-the-loop DAgger [D-17] approach to imitation learning to train a deep neural network to imitate the output of the expert planner. Online augmentation using DAgger enriches the learner's dataset with relevant problem settings that might be lacking in the expert planner's dataset. This benefits from the fact that (unlike a human expert) the expert planner of FIG. 3 is always available to update the training dataset and label new instances experienced by the learner with expert output, leading to much reduced training cost compared to using human expert data. Also, this targeted augmentation is in contrast to other dataset augmentation techniques that rely on random perturbations to the expert problems, e.g. [D-19], [D-21].

To guarantee the safety of the output of the network, a constrained optimisation step is applied, that uses a similar objective function to the expert's, to smooth and improve upon the resulting trajectory from a safety perspective. This uses the architecture of FIG. 9, with the single function approximator 900 (a deep neural network in the following examples) trained to imitate the full expert panner of FIG. 3 (i.e. both the first and second stages 302, 304), and the verification component 712 implemented using the same constrained optimizer as the second stage 304 or a similar constrained optimizer (that is seeded with a high quality solution from the trained function approximator 900 and can operate in runtime). The benefit of this architecture—a neural network 900 followed by an online optimisation stage 712—is a much improved running time when compared to the original optimiser of FIG. 3 (a reduction of around 80% in the experiments document below) with no significant loss in the solution quality in practice, measured by the cost of the objective function of the final trajectory.

In this context, the trajectory verification component 712 receives a trajectory from the neural network 900, which is used to seed a further non-linear optimization performed by the trajectory verification component 712. The further non-linear optimization may result in a modified trajectory that is guaranteed to satisfy whatever constraints are imposed by the trajectory verification component 712. In such implementations, the trajectory verification component 712 may be referred to as a "runtime" or "post-hoc" optimizer (to distinguish from the optimization stages 302, 304 of the expert planner).

Another benefit of imitating an optimisation-based system rather than human data is a much reduced training cost, especially with regard to updating the training dataset and labelling new instances experienced by the learner with expert output. Unlike a human, an optimization-based system can also be used to generate training data for simulated scenarios.

The performance of the present imitation learning and optimisation architecture has been evaluated on sets of simulated experiments generated using a light-weight simulator and using CARLA [D-22], and compared in terms of trajectory cost and runtime to the optimisation planner it is based on, as well as to other alternative architectures that employ the same optimisation component as PILOT.

In summary, one aspect herein is an efficient and safe planning framework for autonomous driving, comprising a deep neural network followed by a constrained optimisation stage.

Another aspect is process of imitating a model-based optimiser to improve runtime efficiency.

These aspects can be combined to provide a robust framework to imitate an expensive-to-run optimiser using a deep neural network and an efficient optimiser with the same cost function (or similar cost functions). An application of this framework to the two-stage optimization-based planner of FIG. 3 is described, which leads to an improvement of around 80% in terms of runtime in key benchmark datasets (see Annex E).

V.2. Pilot: Planning by Imitation Learning and Optimisation

The PILOT solution improves the efficiency of expensive-to-run optimisation-based planners. The input to the planning problem is assumed to be given by $s \in \mathbb{R}^d$, and the goal of the planning to obtain a sequence of states $$\tau^* = \tau_{i=1,\ldots,N} \in \mathbb{R}^{Nd},$$

such that it optimises:

$$\operatorname*{argmin}_{\tau} \mathcal{J}(\tau) \quad \text{s.t. } \tau_0 = s, g(\tau) \leq 0, h(\tau) = 0 \tag{D-1}$$

where g=($g_1$, ..., $g_L$) and h=($h_1$, ..., $h_M$) are possibly nonlinear, non-convex inequality and equality constraints on the planning states, and $\mathcal{J}$ is a cost function defined over the plan. Whilst globally solving this optimisation problem is known to be NP-hard [D-23], [D-24], there are efficient solvers that compute local solutions within acceptable times in practice assuming a sensible initial guess is provided [D-25], [D-26]. Here, υ is defined to be an efficient optimiser that solves Eq. D-1 (e.g. optimiser in [D-25]), and Ω to be an expert expensive-to-run optimisation procedure that attempts to improve upon the local optimum of Eq. D-1 found by υ. Examples of Ω can include performing a recursive decomposition of the problem and taking the minimum cost [D-27] or applying other warm-starting procedures [D-4],[D-28].

The goal of PILOT is to achieve the lower cost on $\mathcal{J}$ provided by Ω, while approximating the efficient runtime of υ. To do so, PILOT employs an imitation learning paradigm to train a deep neural network, $\mathcal{N}_\Theta$ (900, FIG. 9), that imitates the output of Ω, which it then uses to initialise υ in order to output a feasible and smooth trajectory.

In order to achieve that, the network 900 is pre-trained on a dataset of problems labelled by the expert, $\mathcal{D}_0 = \{(s_i, \tau_i)\}_{i=1,...,n}$. Then, using the trained network as the planner in a simulator, a DAgger-style training loop [D-17] is employed to adapt to the covariate shift between the training dataset and the learner's experience in the simulator. See Algorithm 1. In principle, a well-trained neural network could be used at deployment time as a proxy to Ω if it produces feasible trajectories similar to the outputs of the expert in problems close to the ones in the training set. However, the raw output of a neural network is not guaranteed to satisfy solution optimality and the constraints without major investments in robust training [D-29], [D-30] or post-hoc analysis [D-31]. Instead, the neural network $\mathcal{N}_\Theta$ to initialise υ so as to maintain safety and smoothness guarantees. See Algorithm 2.

---

Algorithm 1: PILOT TRAINING PROCEDURE
input : initial dataset $\mathcal{D}_0 = \{(s_i, \tau_i)\}_{i=1,...,n}$, initial
    state $s_0$, expert expensive-to-run planner Ω,
    simulator $\mathcal{S}$, maximum iterations T
output: trained network parameters θ
Initialise $\mathcal{D}$ to $\mathcal{D}_0$
Initialise j to 1
θ ← TRAIN($\mathcal{N}, \mathcal{D}$)
while j < T do
  |  Obtain $s_j$ by stepping in $\mathcal{S}$ with $\mathcal{N}_\Theta(s_{j-1})$
  |  Get $\tau_j$ by optimising $\mathcal{J}$ using Ω given $s_j$
  |  Update $\mathcal{D}$ to $\mathcal{D} \cup \{(s_j, \tau_j)\}$
  |  // retrain network every K steps
  |  if j mod K = 0 then
  |  |  Update θ ← TRAIN($\mathcal{N}, \mathcal{D}$)
  |  end
  |  j ← j + 1
end
return θ

---

Algorithm 2: PILOT INFERENCE STEP
input : state s, efficient planner υ, trained imitation
    network $\mathcal{N}_\Theta$
output: optimal plan τ*
Obtain initial guess τ' ← $\mathcal{N}_\Theta(s)$
Get τ* by optimising $\mathcal{J}$ using υ given s and τ'
return τ*

---

V.3 Pilot for the Two Stage Optimisation-Based Motion Planner

For the purpose of illustration only, the base planner is implemented using the 2s-OBT framework of FIG. 3, in which a planning architecture comprising a sequence of two optimisation stages is introduced for autonomous driving.

A. Two-Stage Optimisation-Based Motion Planner

Figure 15:
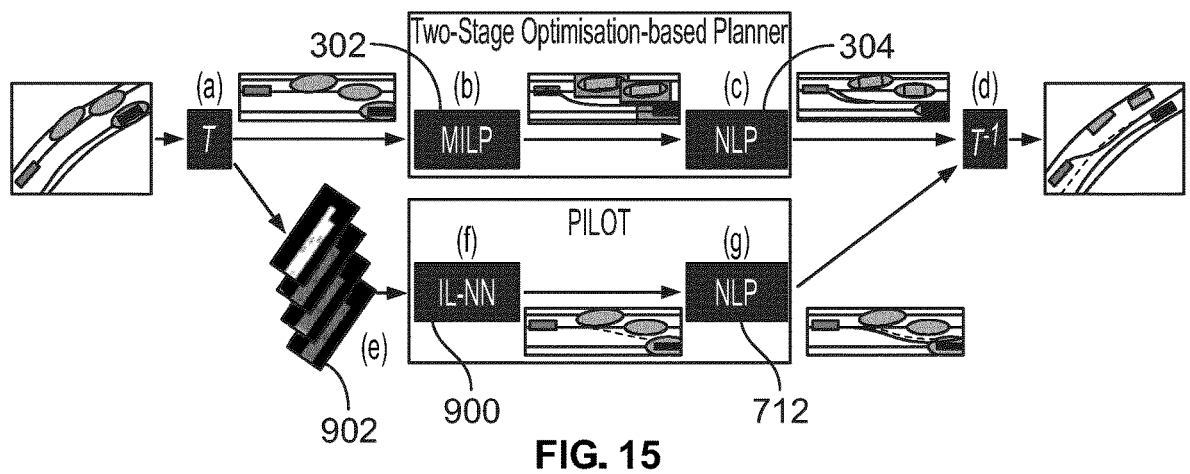
FIG. 15 shows an example PILOT system architecture.

FIG. 15 (top) shows the architecture of the 2s-OPT planner, as in FIG. 3. The input to the system are: 1) a birds-eye view of the planning situation, that includes the ego vehicle, other road users and the relevant features of the static layout; 2) a route plan as a reference path, provided by an external route planner; and 3) predicted traces for all road users, provided by a prediction module.

In 2s-OPT, projecting the world state and road user predictions into a reference path-based coordinate frame produces the input to the optimisation. The first optimisation stage 302 solves a linearised version of the planning problem using a Mixed Integer Linear Programming (MILP) solver. This minimises a cost function that encodes desirable plan features, such as passenger comfort and progress along the reference path, while satisfying hard constraints that encode safety requirements. The output of the MILP solver is fed as a warm-start initialisation to a constrained, non-linear optimiser 304. This second optimisation stage ensures that the output trajectory is smooth and feasible, while maintaining the safety guarantees.

As discussed above, although the framework produces superior outputs when compared to alternatives with regard to solution quality (measured by convergence guarantee and output cost values), it suffers from the limitation of pure optimisation approaches in solving time, as the method effectively trades off efficiency for better solution quality.

B. Implementation Details

PILOT is used with the two stage optimisation (2s-OPT) approach of FIG. 3 as the base planner. Referring to FIG. 15 (bottom), a convolutional neural network is 900 to take as input a graphical representation 902 of the reference path-projected planning situation (including predictions of other road users) in addition to other scalar parameters of the problem (e.g., speed of the ego vehicle), and output a smooth trajectory that imitates the output of the optimiser when presented with the same problem. 2s-OPT is run on a dataset of problems to initiate the training, and uses to label the new planning problems generated by the learner in simulations. The post-hoc optimizer 712 implements a nonlinear constrained optimisation stage, similar to the second stage 304 in 2s-OPT to maintain safety and smoothness guarantees.

1) System Architecture:

FIG. 15 (bottom) shows PILOT's system architecture for 2s-OPT. After the planning problem is transformed (using transform $\mathcal{T}^{-1}$) from the global coordinate frame to the reference path-based coordinate frame, a sequence of images 902 of the scene are then produced to encode the predicted future of dynamic road users. These images 902 are part of the input to the neural network 900. The output of the network 900 is a trajectory in the reference path coordinate frame, which is used as a warm-start initialisation for the constrained, nonlinear programming (NLP) optimisation stage 712 to enforce certain desired qualities of the output trajectory. Finally, the optimiser's output is then transformed back to the global coordinate frame by the inverse transform $\mathcal{T}^{-1}$.

2) Network Input Representation:

The planning problem input comprises the static road layout, road users with their predicted trajectories, and a reference path to follow. As the problem is transformed to the reference path coordinate frame, the transformed scene is automatically aligned with the area of interest—the road along the reference path. This simplifies the representation to the neural network 900.

To encode the predicted trajectories of dynamic road users, C greyscale top-down images of the scene of size W×H are produced by uniformly sampling in time the positions of road users along their predicted trajectories at times $$t \in 0, \frac{h}{C-1},$$

h for the planning horizon h. These images create an input tensor of size C×W×H, allowing convolutional layers to be used to extract semantic features of the scene and its temporal evolution. The static layout information is present on all channels.

Additional information of the planning problem that is not visualised in the top-down images (such as the initial speed of the ego vehicle) are appended as scalar inputs, along with the flattened convolutional neural network (CNN) output, to the first dense layer of the network.

Figure 17:
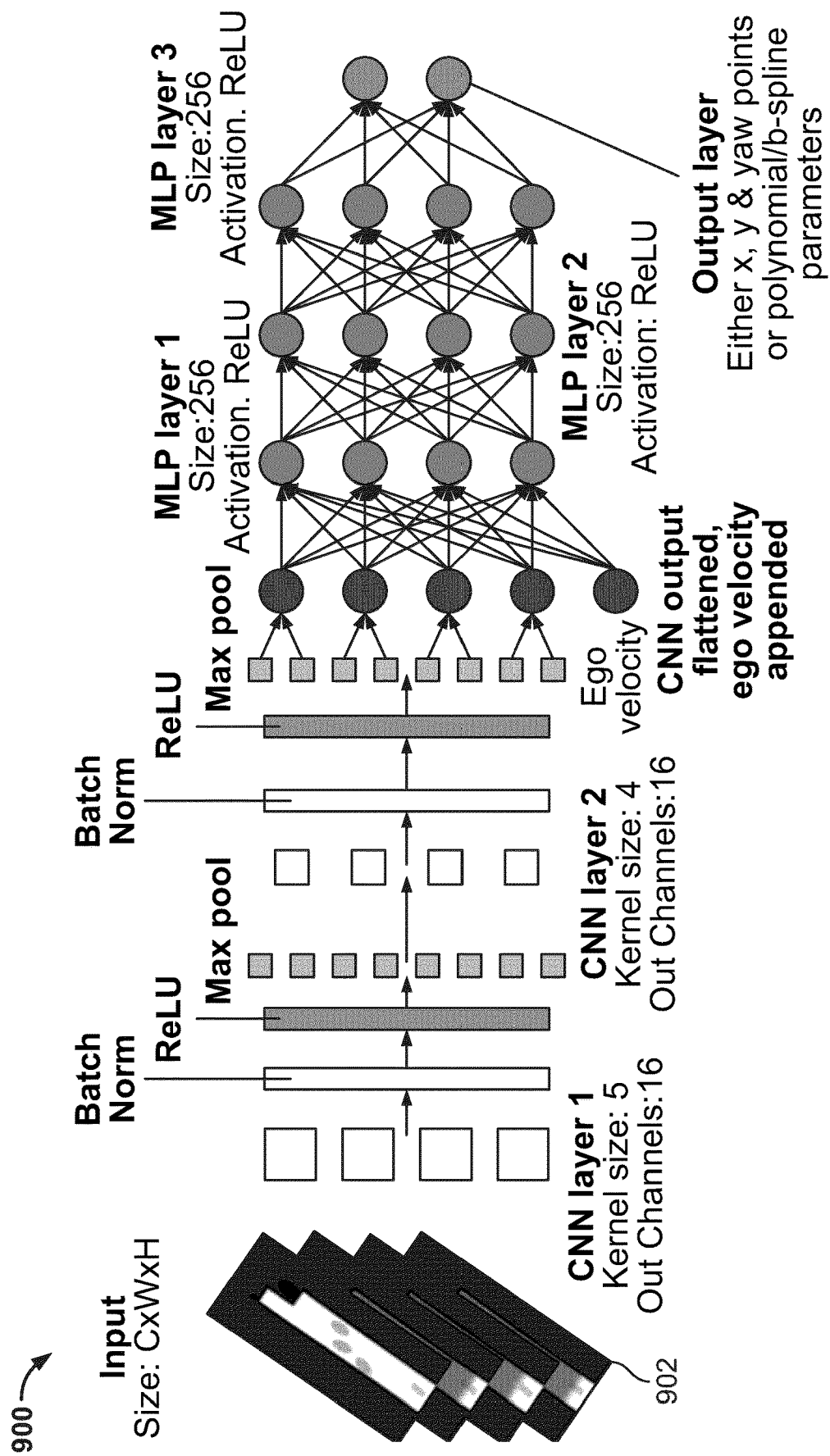
FIG. 17 shows an example PILOT network architecture.

FIG. 17 shows further details of an example convolutional architecture for the neural network 900.

3) Network Output Representation:

The output of the network is a trajectory in the reference path coordinate frame. One possibility is to output a tensor of size 2×(h·f) for a planning horizon h and planning frequency f, encoding timestamped spatial points $\tau = \{(x_j, y_j)\}_{j=1,\ldots,N}$. To enforce output smoothness, an alternative is to train the network to produce parameters for smooth function families, e.g. polynomials and B-splines, over time, namely $f_x(t)$ and $f_y(t)$.

The post-hoc NLP optimisation stage (detailed below) expects as input a time-stamped sequence of states, each comprising: (x,y) position, speed, orientation and control inputs (steering and acceleration), all in the reference path coordinate frame. Velocities and orientations are calculated from the sequence of points produced by the network (or sampled from the smooth function output). Control input is derived from an inverse dynamics model.

4) Neural Network Training:

a) Pre-training: The neural network is trained to imitate the output of the 2s-OPT. In a supervised learning fashion, the expert data is produced by running 2s-OPT in problems generated by simulating various configurations of driving instances to create a training dataset $\mathcal{D}_0 = \{(s_i, \tau_i^{exp})\}_{i=1,\ldots,n}$. The training loss is defined as the $L_2$ norm distance between the expert trajectory and the network output:

$$\min_\theta \sum_{\mathcal{D}} \left[ \sum_{k=0}^{N} (x_k^\theta - x_k^{exp})^2 + (y_k^\theta - y_k^{exp})^2 \right]^{\frac{1}{2}}, \quad \text{(D-2)}$$

where θ refers to the neural network parameter vector, $\mathcal{D}$ is the dataset of training examples, and the identifier exp indicates an expert trajectory from the dataset. An ADAM optimiser [32] is used to determine update step sizes.

b) DAgger training: Dataset Aggregation (DAgger) [D-17] is a training regime that reduces the difference between the distribution of the problems in the expert dataset and the distribution of problems seen by the learner when interacting with its environment. It does this by augmenting the training dataset online with additional problems generated by the pre-trained learner network when interacting with the environment in simulation. A requirement of DAgger is an interactive expert that can be queried for solutions to the new problems in a scalable way. This is satisfied in our case by the 2s-OPT which labels the new problems with high quality solutions. The DAgger process alternates between problem generation in the simulation and training the network as described in Algorithm 1.

Expanding on the benefits of DAger training, typical supervised learning problems assume the data-generation process is iid (independent and identically distributed). In the case of autonomous driving, this assumption is flawed. For effective driving, a key aspect is the accumulation of errors across time. The distribution of 'problems' (scenario states) seen by an agent when driving depends on that agent's previous actions. If the ego's actions lead to problems that lie outside the domain of demonstrations seen by the learner, then the learner's planning relies on generalisation.

A scenario state in this context is a snapshot of a scene at a given time instant with an ego (simulated agent or real vehicle) to plan for and all other agents' trajectories having been predicted.

Figure 16:
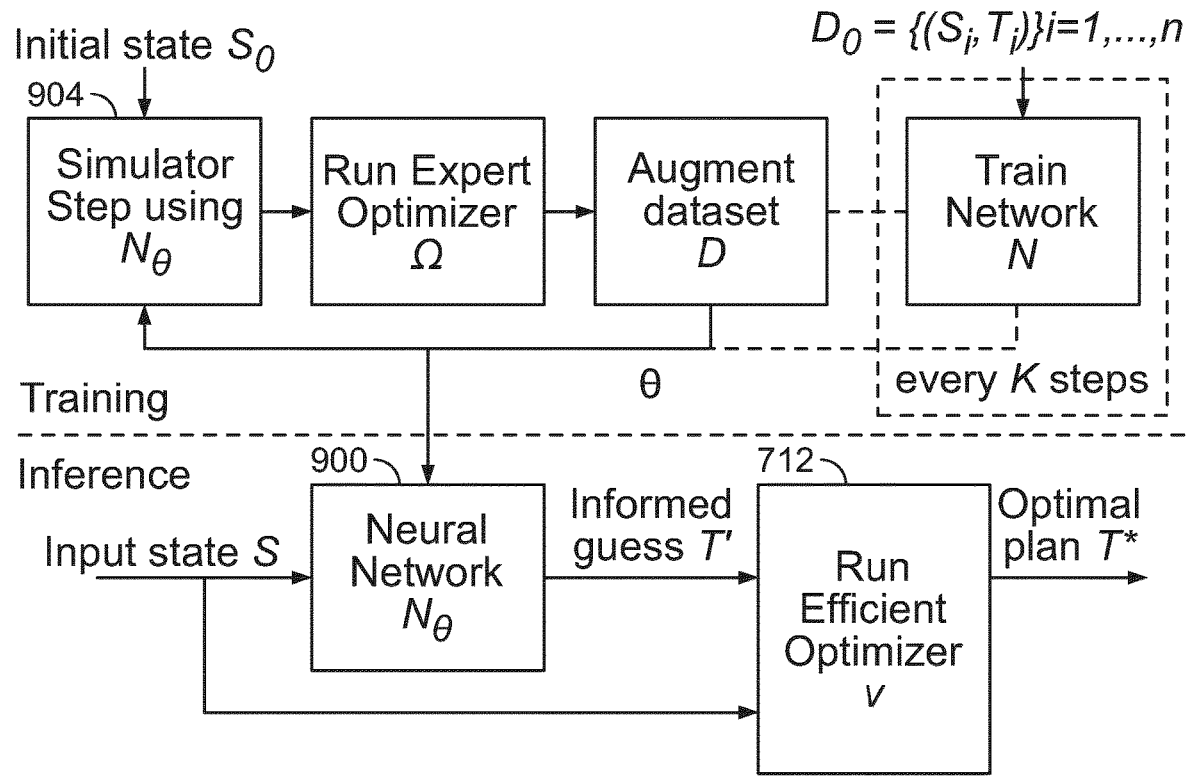
FIG. 16 shows a schematic block diagram for a PILOT training scheme.

FIG. 16 shows a schematic block diagram of a PILOT training scheme. PILOT uses an expert-in-the-loop imitation learning paradigm to train a deep neural network, $\mathcal{N}_\theta$ (900), that imitates the output of the expensive-to-run optimisation-based planner Ω (top). At inference time, it uses the output of $\mathcal{N}_\theta$ to initialise an efficient optimiser v (712) to compute a feasible and low-cost trajectory (bottom).

As per Algorithm 2, the scheme alternates between training steps and augmentation steps. The first training set is performed on a large dataset $\mathcal{D}_0$ of examples obtained using the reference planner Ω. In each subsequent training step, the parameters θ are tuned via training on an augmented training set $\mathcal{D}$, as augmented in the previous augmentation step. In each augmentation step the (partially trained) network 900 is applied to simulated scenarios in a simulator 904, by using the partially trained network 900 to plan trajectories for a simulated ego agent (typically in response to other agent(s) in the scenario). The expert planner Ω is then applied in "shadow mode", i.e. given snapshots ($x_0$, $O_{0:n}^{1:N}$, $\Sigma_{0:n}^{1:N}$) of the scenarios encountered in the most recent set of simulations, the reference planner Ω is used to generate expert trajectories at those time instants, which in turn are used to augment the training set $\mathcal{D}$ for the next training step. Note that the evolution of each simulated scenario is determined, at least in part, by the actions of the partially trained network 900 (for example, at some time into the scenario, $x_0$ would generally depend on earlier actions by the partially trained network 900, as may the other parameters $O_{0:n}^{1:N}$, $\Sigma_{0:n}^{1:N}$ e.g. in the event the other agents are reacting to the ego agent); the reference planner Ω then provides expert trajectories for those scenarios (but, unlike the network 900, does not control the ego agent or influence the simulated scenarios, because the aim is to expose the reference planner Ω to scenarios in which errors by the partially trained network 900 might have accumulated over time).

5) Post-Hoc Optimisation Stage:

In the post-hoc optimizer 712, the design of the constrained, non-linear optimisation stage of 2s-OPT is followed to smooth and rectify the trajectory generated by the imitation learning network. More specifically, a discrete bicycle model for the ego vehicle is used:

$$\begin{bmatrix} x_{k+1} \\ y_{k+1} \\ \phi_{k+1} \\ v_{k+1} \end{bmatrix} = \begin{bmatrix} x_k \\ y_k \\ \phi_k \\ v_k \end{bmatrix} + \begin{bmatrix} v_k\cos(\phi_k + \delta_k) \\ v_k\sin(\phi_k + \delta_k) \\ \dfrac{2v_k}{L}\sin(\delta_k) \\ a_k \end{bmatrix} \Delta t \quad \text{(D-4)}$$

where $z_k=[x_k, y_k, \phi_k, v_k]^T$ describes the state of the ego at time k with $(x_k, y_k)$ being the reference-path projected position, $\phi_k$ is the vehicle's yaw angle, and $v_k$ is its speed. $(a_k, \delta_k)$ represent the acceleration and steering controls applied to the vehicle at time k, and L is the distance between axles.

Constraints are enforced that maintain acceleration and steering values within the permitted ranges, limit maximum jerk and angular jerk, and maintain speed within the allowed speed limit for the road. Also, constraints are added that ensure that the corners of the ego vehicle's footprint are at all times bounded within the road surface, and that prevent collision with other road users.

The post-hoc optimizer 712 optimizes a cost function defined as $$J(z_{0:N}, u_{0:N-1}) = \sum_{k=0}^{N}\sum_{i \in I}\omega_i \theta_i(z_k, u_k) \quad \text{(D-5)}$$

where $\omega_i \in \mathbb{R}$ are scalar weights, and $\theta_i(z_k, u_k)$ are soft constraints that measure deviation from the desired speed, the reference path and the end target location, and that control the norms of acceleration and steering control inputs. Parameters of the optimisation are fine-tuned using grid-search in the parameter space. See Annex B for a more detailed formulation of the optimisation problem.

The output of the imitation learning neural network is used as an initialisation to this optimisation problem. As the NLP solver converges faster when initialised with a feasible solution, as demonstrated in Annex A, the initialisation trajectory is processed to cap abnormal values of calculated speed, acceleration and steering that might break some of the hard constraints. The process is detailed in Annex C.

The described approach poses no restrictions on the design of the optimisation objective that the planner output is desired to respect, while in settings such as [D-20] the optimisation problem should be carefully designed to ensure that the optimisation constraints are differentiable in order for them to be usable to train the planner network.

In general, a function approximator takes the form of one or more trainable models than can be trained to imitate an expert. Those models can take any form, including but not limited to neural network(s). The expert may be a computer-implemented planner (not necessarily required to operate in real-time), as in the above examples. In that case, the one or more models are chosen so that they can be applied with fewer computing resources or memory resources than the expert planner (preferably in real-time). This generally means trading efficiency (time and/or memory efficiency) for accuracy (i.e. the accuracy with which the function approximator is able to imitate the expert)—in the embodiments described above, the trade of is specifically that the trained function approximator may no longer be guaranteed to satisfy the hard constraints on the NLP stage. However, this issue is addressed by implementing the NLP logic at runtime, to refine the initial trajectory produced by the function approximator, and in this context it is not necessary for the trained function approximator to perfectly imitate the expert.

As will be appreciated, whilst the above considers a particular form of multistage optimization-based planner as an expert to be imitated, the function approximator can be trained to implement other types of planner. There are particular benefits when the expert planner has the ability to produce high-quality trajectories, but requires significant computational and/or memory resources to do so. It also feasible to use a human expert(s) to provide at least some of the training data for the function approximator.

References herein to components, functions, modules and the like, including the optimizers of the first and second stages 302, 304, the function approximators 702, 604 and 900, and the verification component 712, denote functional components of a computer system which may be implemented at the hardware level in various ways. A computer system comprises one or more computers that may be programmable or non-programmable. A computer comprises one or more processors which carry out the functionality of the aforementioned functional components. A processor can take the form of a general-purpose processor such as a CPU (Central Processing unit) or accelerator (e.g. GPU) etc. or more specialized form of hardware processor such as an FPGA (Field Programmable Gate Array) or ASIC (Application-Specific Integrated Circuit). That is, a processor may be programmable (e.g. an instruction-based general-purpose processor, FPGA etc.) or non-programmable (e.g. an ASIC). A computer system may be implemented "onboard" a mobile robot (such as an AV) or "offboard" for example in a simulator context.

For example, an offboard implementation of the full multi-stage optimization could be implemented for the purpose of training on-board components, but also for other purposes, such as safety testing or other performance testing, verification etc. Performance testing could involve implementing any of the above trained function approximators 702, 604, 900 and (where applicable) the verification component 712 in an offboard computer system as part of the performance testing, applied to simulated scenarios.

In an on-board implementation, the multi-phase optimization may be implemented in full, or one or more (including all) optimization stages may be replaced with one or more function approximators.

Annex E documents experimental results that demonstrate the efficacy of the PILOT architecture (as described in Section V.).

Results are given in Annex A to demonstrate the efficacy of the 2s-OPT of Section IV.

Annex A—Results and Evaluation for 2s-OPT Planner

The 2s-OPT methodology of section IV. has been subject to empirical testing to further demonstrate is efficacy.

Figure 10:
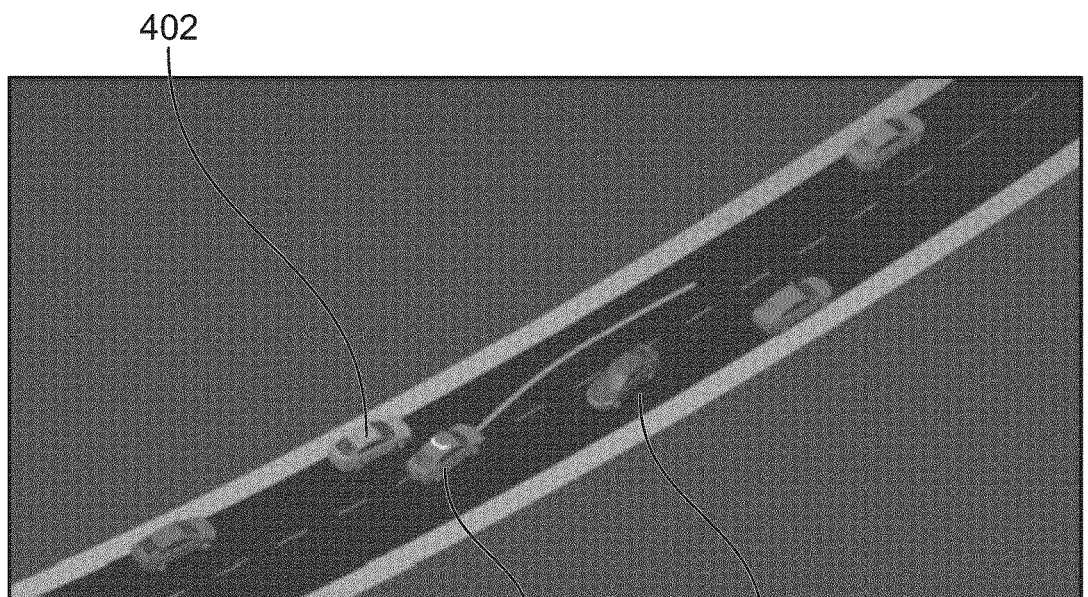
FIG. 10 shows further examples of driving scenarios.
Figure 10:
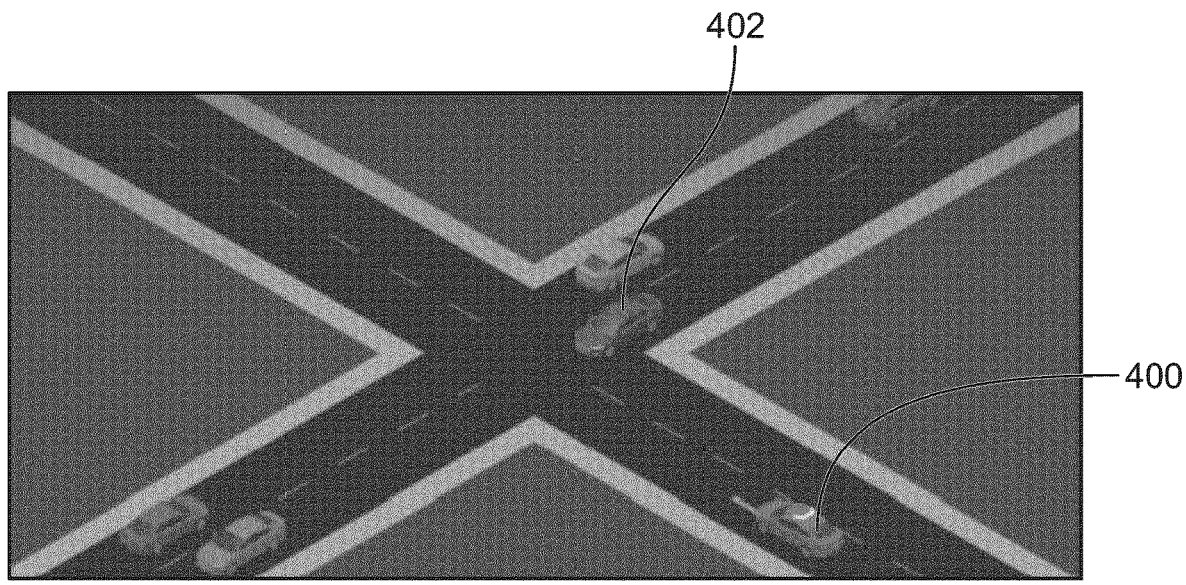

Reference is made to FIG. 10, which shows, in the top half, an overtaking scenario somewhat analogous to that of FIGS. 4 and 5. Specifically, the top scenario of FIG. 10 shows a scenario with overtaking of static vehicles 402 with an oncoming vehicle 404 in residential driving.

The bottom half of FIG. 10 shows an alternative, junction scenario, which uses like reference numerals to denote the ego vehicle 400 and an external actor 402. This is an unprotected right turn in a junction.

In this section we will show that:
1) our method is general and can be applied to a diversity of driving situations
2) the MILP stage provides the NLP stage with a better initialization when compared to simpler heuristics, leading to higher convergence rates, faster solving times and more optimal solutions;

3) our method leads to solutions that outperform a Nonlinear Model Predictive Control (NMPC) approach similar to the one presented in [E-25] in progress and comfort metrics.

To that end, we implement the first stage (MILP; Problem 3) using Gurobi 8.1 [E-15], and the second stage (NLP; Problem 2) using IPOPT [29]. Both solvers have a timeout of 25 s, after which the optimization is stopped. We use N=40 and Δt=0.2s for a trajectory horizon of 8 s (Other parameters are listed in Appendix A). Without loss of generality, we assume left-hand traffic where drivers are expected to be on the left hand side of the road, that a route planner is available to generate a reference path the satisfies the planning goal in the local coordinate frame, and consider a constant velocity model for the prediction of dynamic agents. In the simulator, the behavior of other dynamic vehicles is based on the Intelligent Driver Model [E-27].

VI.1 Generality

Figure 11:
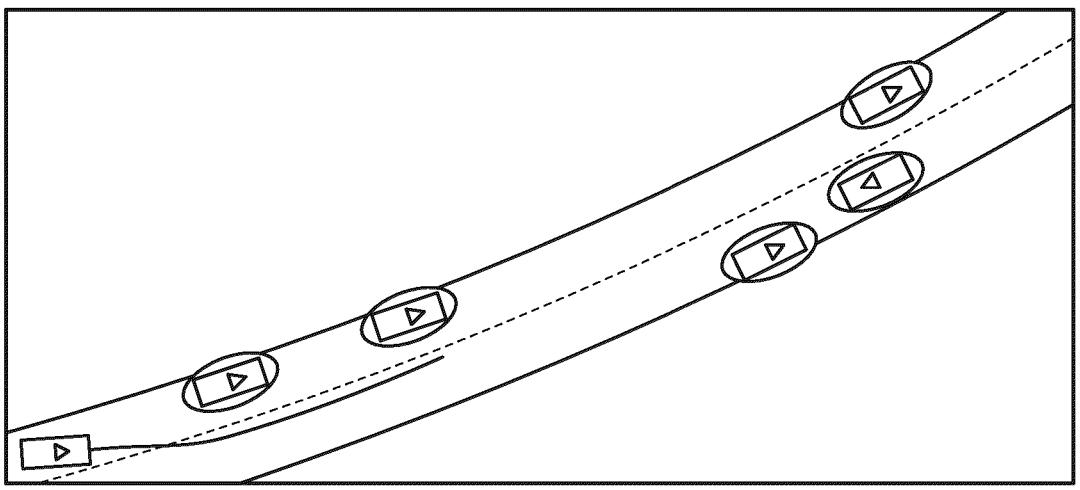
FIG. 11 shows an example of a plan computed for a first example driving scenario.
Figure 11:
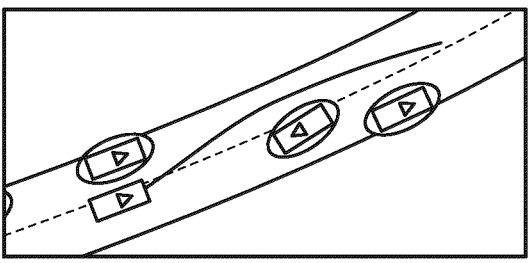
Figure 11:
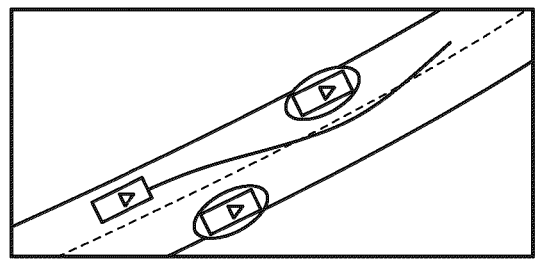
Figure 11:
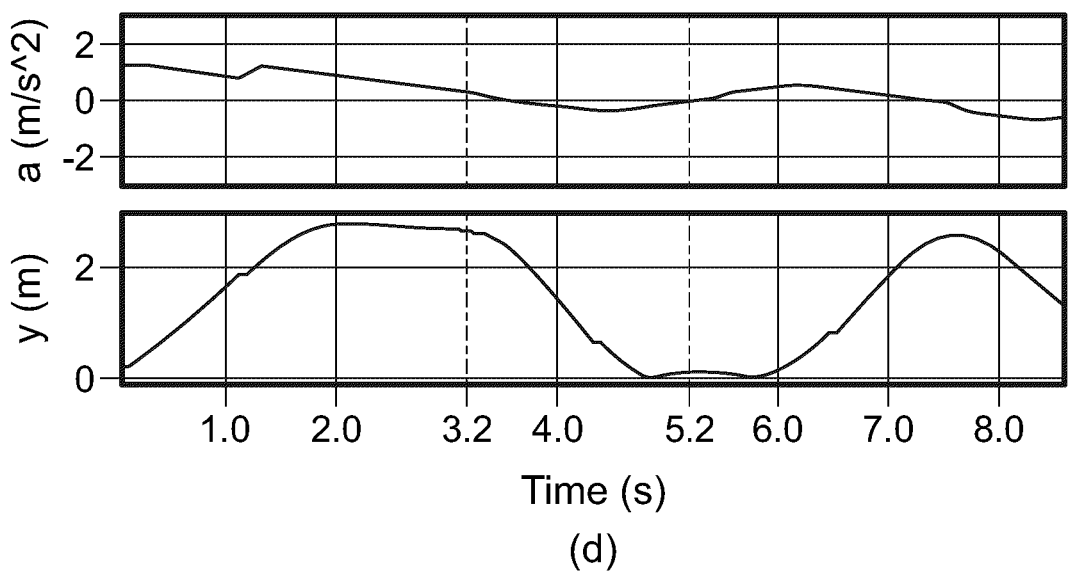
Figure 12:
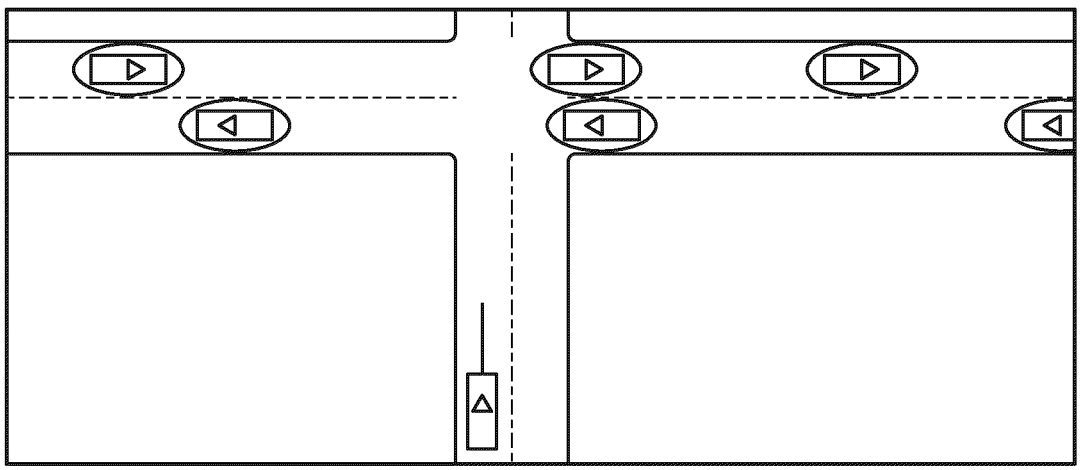
FIG. 12 shows an example of a plan computed for a second example driving scenario.
Figure 12:
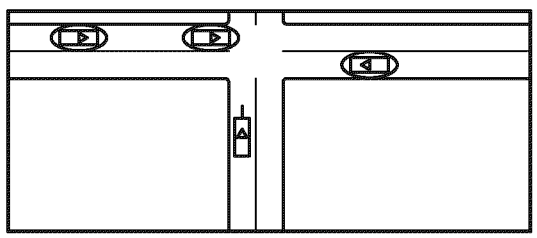
Figure 12:
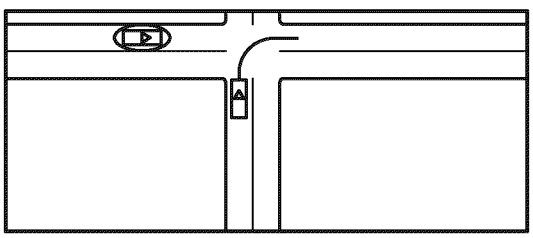
Figure 12:
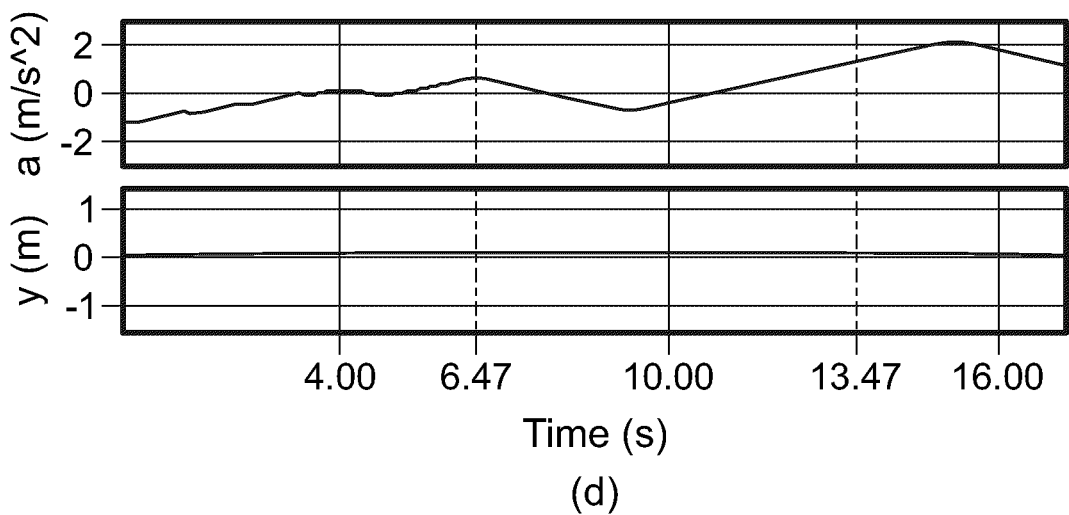

FIGS. 11 and 12 show two qualitatively distinct driving situations. In FIG. 11 the ego-vehicle overtakes parked vehicles on a two-lane road while taking into account an oncoming vehicle on the other lands that is also overtaking a static vehicle in its own lane (the reference path) for overtaking, and returning to it as soon as possible, while always maintaining a smooth acceleration profile. The second example in FIG. 12 shows an unprotected right turn into a main road. FIG. 12(d) shows the ego-vehicle closely reference path (right turn into the main road) while smoothly responding to unforeseen behaviors of the dynamic vehicles.

Figure 13:
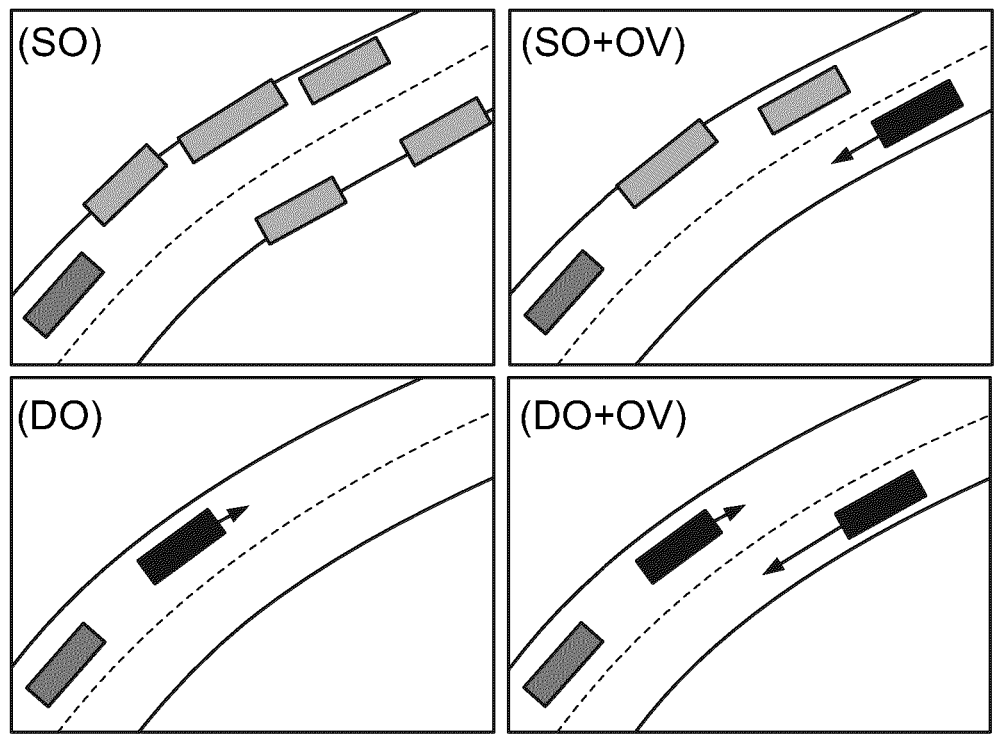
FIG. 13 shows an example of a residential driving scenario.

FIG. 13 shows examples of the four different simulation scenarios we consider for experiments 2) and 3): (SO) static overtaking of parked vehicles on both side of the road; (SO+OV) static overtaking with a dynamic vehicle in the oncoming lane; (DO) dynamic overtaking of a slow moving vehicle; and (DO+OV) dynamic overtaking with an oncoming vehicle on the other lane. For the experiments, we generate datasets of examples per scenario by randomizing over relevant parameters (e.g. initial speeds and numbers of vehicles). More details are presented in Supplementary Material—Appendix B.

VI.2 Initialization Comparison

We consider four heuristic initializations as alternatives to our MILP stage: ZEROS, in which all states and controls are initialized to zero; C.VEL, where the ego-vehicle is assumed to maintain its speed throughout the solution; C.ACC, where the ego-vehicle maintains a constant acceleration of 1 ms$^{-2}$ until the maximum speed is achieved; and C.DEC where the ego-vehicle maintains a constant acceleration of −1 ms$^{-2}$ until it stops.

Figure 14:
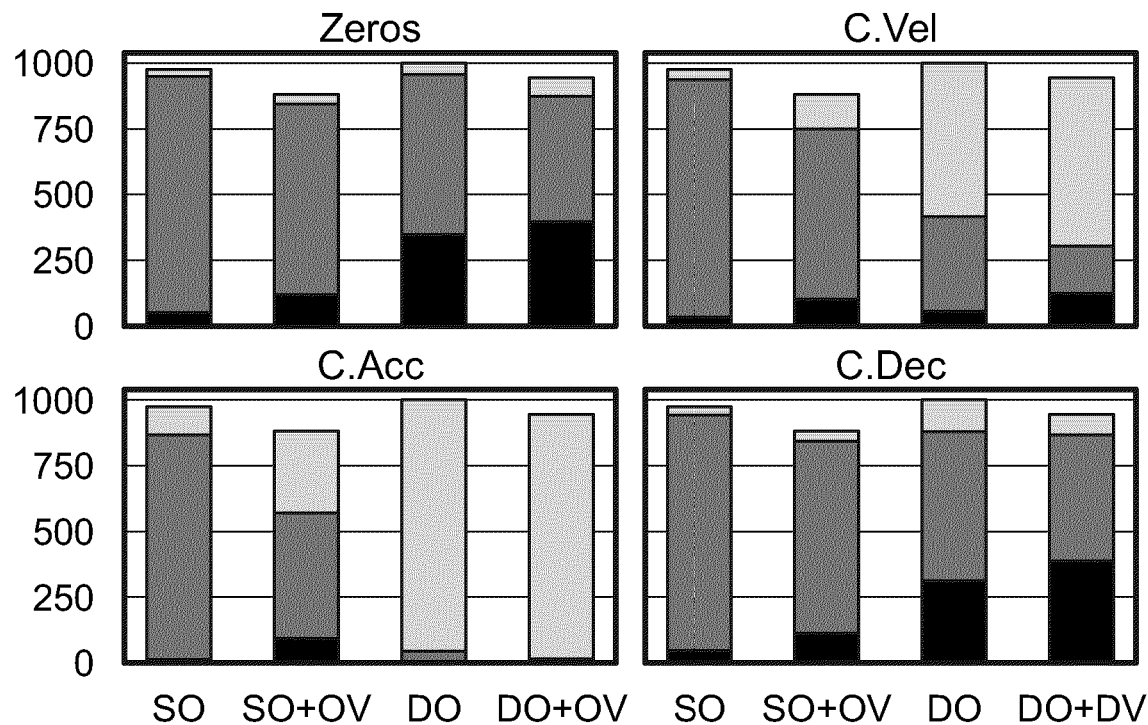
FIG. 14 shows a plot summarizing a set of results that demonstrate the efficacy of initializations generated using the present techniques on different scenarios.

A dataset of 1000 examples per scenario was procedurally generated, solved using our method as well as suing only the NLP stage for the same constrains initialized by each of the four heuristics. Table D-I presents the percentage of solved examples within the allocated time (25 s) per initialization method and scenario. As it can be observed, our method either performs similarly or outperforms other methods in all the scenarios considered. In FIG. 14 we analyze the problems that were solved using our initialization when compared to the other initialization methods. We observe that, across scenarios ZEROS and C.DEC lead to the highest percentage of solved problems (after ours) and same solutions, but also the highest percentage of different solutions. To analyze this further, for problems where a different solution is reached (darker bars in FIG. 14) Table II shows the average % difference in cost that the alternatives achieve compared to ours. For problems with similar solutions (lighter bars in FIG. 14), Table II presents the average % difference in solving time.

We see that, in general, other initialization methods obtain higher costs on average than ours. While C.ACC is able to achieve a lower average cost in some scenarios, it leads to a substantial number of unsolved examples, particularly for DO and DO+OV (see FIG. 14). In all scenarios where the same solutions is reached by an alternative method, it takes longer to solve on average. A noteworthy case is DO+OV initialized with C.ACC which takes 306.32% longer on average to reach the same solution as ours. These results validate our claim that we achieve higher convergence rates (as shown by Table I), faster solving times and more optimal solutions (as evidenced by FIG. 14 and Table II).

VI.3 NMPC Baseline Comparison

We compare our method to an NMPC baseline which optimizes Problem 2 with the same soft and hard constraint but in a receding-horizon fashion similar to [25]. This baseline uses the same interior-point optimization method as our NLP stage to solve each of the horizon steps. To evaluate the quality of the methods, we introduce the following metrics that compare our solution, $(x_{1:N}^{Ours}, u_{1:N-1}^{Ours})$, to the baseline's, $(x_{1:N}^{NMPC}, u_{1:N-1}^{NMPC})$:

Progress: our overall progress compared to the baseline's $$\Delta P = \max(x_{1:N}^{Ours}) - \max(x_{1:N}^{NMPC})$$

Reference path deviation: our average deviation from the reference path compared to the baseline's $$\Delta D = \frac{1}{N-1} \sum_{k=1}^{N} |y_k^{NMPC}| - |y_k^{Ours}|$$

Target speed matching: for a given target speed $v_g$, comparison of our average matching with the baseline's $$\Delta v_M = \frac{1}{N-1} \sum_{k=1}^{N} |v_k^{NMPC} - v_g| - |v_k^{Ours} - v_g|$$

Jerk: comparison of our average jerk value with the baseline's $$\Delta |a| \frac{1}{N-1} \sum_{k=1}^{N} \frac{a_k^{NMPC} - a_{k-1}^{NMPC}}{\Delta t} - \frac{a_k^{Ours} - a_{k-1}^{Ours}}{\Delta t}$$

We generate 1000 examples per scenario and solve them using our method and the NMPC baseline. The top of Table III presents the percentage of the examples that are solved by both methods. In all scenarios, our method solves more examples than the baseline. For the problems that are solved by both we show the metrics per scenario in the bottom of Table III. We achieve significantly higher progress and better velocity matching across scenarios, and similar or slightly smaller jerk values and deviation from the reference path.

These results validate our claim that our method is better in progress and comfort metrics than the baseline that has a similar formulation to [E-25].

TABLE I

Initialization Comparison: percentage of solved examples per initialization method (rows) and scenario (columns).

|        | SO     | SO + OV | DO     | DO + OV |
|--------|--------|---------|--------|---------|
| Zeros  | 98.57% | 95.55%  | 96.97% | 93.48%  |
| C.VEL  | 96.85% | 85.68%  | 42.42% | 32.40%  |
| C.Acc  | 89.23% | 64.43%  | 5.61%  | 1.97%   |
| C.DEC  | 98.58% | 95.66%  | 88.79% | 92.44%  |
| Ours   | 98.47% | 95.77%  | 99.40% | 98.14%  |

TABLE III

NMPC Baseline Comparison: Top—percentage of solved problems per scenario. Bottom—average results for difference in progress $\Delta P$, deviation from reference $\Delta D$, velocity matching $\Delta v_M$, and jerk $\Delta|\dot{a}|$ (positive and higher is better).

|          |              | SO     | SO + OV | DO     | DO + OV |
|----------|--------------|--------|---------|--------|---------|
| % Solved | NMPC         | 96.15% | 79.45%  | 89.17% | 85.74%  |
|          | Ours         | 98.38% | 96.50%  | 99.60% | 98.65%  |
| Metrics  | $\Delta P$ (m) | 7.12 | 8.37    | 4.63   | 8.04    |
|          | $\Delta D$ (m) | -0.03 | 0.06   | 0.10   | 0.03    |
|          | $\Delta v_M$ (m/s) | 0.81 | 0.79 | 0.25  | 0.49    |
|          | $\Delta|\dot{a}|$ (m/s+HU3) | 0.01 | 0.01 | 0.01 | 0.0 |

TABLE II

Initializaion Comparison: in cases where the optimum is different (left), the average percent difference in the objective function value (cost) between the alternative method and our solution is show (positive and higher is better for our method), with the respective number of examples in parenthesis; in cases in which the optimum is the same (right), the average difference in solving time as a percent of the one of our method is shown (positive and higher is better for our method), with the number of examples in parenthesis.

|        | % Change in Cost (# situations) | | | | % Change in Solving Time (# situations) | | | |
|--------|------|------|------|------|------|------|------|------|
| Init.  | SO   | SO + OV | DO | DO + OV | SO | SO + OV | DO | DO + OV |
| ZEROS  | +85.39(56) | +68.53(126) | +52.36(356) | +25.96(403) | +42.86(902) | +47.62(728) | +154.42(607) | +104.44(483) |
| C.VEL  | +60.24(44) | +47.69(112) | +29.55(64)  | +1.35(126)  | +12.53(903) | +16.39(652) | +70.01(358)  | +94.71(187)  |
| C.ACC  | +6.16(20)  | -10.77(100) | +0.01(2)    | -7.67(5)    | +12.93(856) | +19.16(178) | +231.79(54)  | +306.32(14)  |
| C.DEC  | +85.01(55) | +67.39(123) | +36.79(322) | +24.51(396) | +7.93(903)  | +3.43(732)  | +70.23(565)  | +17.61(483)  |

A. Optimization Parameters

The parameters used in the solving of Problem 2 and 3 in the context of Sec. VI are defined in Table A1

TABLE A1

Parameters used in the MILP and NLP optimization stages

| Parameter | Stage | Value | Parameter | Stage | Value |
|-----------|-------|-------|-----------|-------|-------|
| L | NLP | 4.8 | $a_{min}^{\omega}$ | MILP | -3 |
| $\delta_{max}$ | NLP | 0.45 | $a_{max}^{\omega}$ | MILP | 3 |
| $a_{min}$ | NLP | -3 | $a_{min}^{y}$ | MILP | -0.5 |
| $a_{max}$ | NLP | 3 | $a_{max}^{y}$ | MILP | 0.5 |
| $\dot{a}_{max}$ | NLP | 0.5 | $\Delta a_{max}^{x}$ | MILP | 0.5 |
| $\dot{\delta}_{max}$ | NLP | 0.18 | $\Delta a_{max}^{y}$ | MILP | 0.1 |
| $\ddot{a}_{max}$ | NLP | 0.5 | $v_{min}^{x}$ | MILP | 0 |
| $v_{max}$ | NLP | 0 | $v_{max}^{x}$ | MILP | 3 |
| $v_{min}$ | NLP | 10 | $v_{min}^{y}$ | MILP | -1 |
| $\omega_x$ | NLP | 0.1 | $v_{max}^{y}$ | MILP | 1 |
| $\omega_v$ | NLP | 2.5 | $\Omega_x$ | MILP | 0.9 |
| $\omega_y$ | NLP | 0.05 | $\Omega_v$ | MILP | 0.5 |
| $\omega_a$ | NLP | 1.0 | $\Omega_y$ | MILP | 0.05 |
| $\omega\delta$ | NLP | 2.0 | $\Omega_a$ | MILP | 0.4 |
| $\rho$ | MILP | 1.5 | M | MILP | $10^4$ |
| d | MILP | 0.9 | | | |

B. Generalization of Scenario Examples

For the randomly generated scenarios presented in Sec. V, we assume the ego vehicle has length 4.8 m and width 1.9 m. the example used in this work were procedurally generated by uniform sampling the parameters of the scenarios, following the ranges defined in Tables B1, B2, B3, B4, and B5.

TABLE B1

Common parameters

| Parameter | Min | Max |
|---|---|---|
| Number of lanes | 2 | 2 |
| Lane width (m) | 3.5 | 4.3 |
| Ego initial x (m) | 0 | 0 |
| initial y (m) | $b_l(x) + 0.55 * 1.9$ | $b_r(x) - 0.55 * 1.9$ |
| initial $\upsilon$ (ms$^{-1}$) | 0 | 9.5 |
| initial $\phi$ (rad) | $-\pi/12$ | $+\pi/12$ |

TABLE B2

Parameters of scenario SO

| Parameter | | Min | Max |
|---|---|---|---|
| Number of static vehicles | | 2 | 6 |
| Static vehicle | x (m) | 0 | 80 |
| | y (m) | $b_l(x)$ | $b_r(x)$ |
| | width (m) | 1.7 | 2.5 |
| | length (m) | 4.0 | 8.0 |

TABLE B3

Parameters of scenario SO + OV

| Parameter | | Min | Max |
|---|---|---|---|
| Number of static vehicles | | 2 | 6 |
| Static vehicle | x (m) | 0 | 80 |
| | y (m) | bi(x) | 0 |
| | width (m) | 1.7 | 2.5 |
| | length (m) | 4.0 | 8.0 |
| Oncoming vehicle | initial x (m) | 20 | 80 |
| | initial y (m) | $b_l(x)/2$ | $b_r(x)/2$ |
| | initial $\upsilon$ (ms$^{-1}$) | 1.0 | 8.5 |
| | width (m) | 1.7 | 2.5 |
| | length (m) | 4.0 | 8.0 |

TABLE B4

Parameters of scenario DO

| Parameter | | Min | Max |
|---|---|---|---|
| Dynamic vehicle initial | initial x (m) | 20 | 80 |
| | y (m) | $b_l(x)/2$ | $b_r(x)/2$ |
| | initial $\upsilon$ (ms$^{-1}$) | 0.5 | 3.5 |
| | width (m) | 1.7 | 2.5 |
| | length (m) | 4.0 | 8.0 |

TABLE B5

Parameters of scenario DO + OV

| Parameter | | Min | Max |
|---|---|---|---|
| Oncoming vehicle | initial x (m) | 20 | 80 |
| | initial y (m) | $b_l(x)/2$ | $b_r(x)/2$ |
| | initial $\upsilon$ (ms$^{-1}$) | 1.0 | 8.5 |
| | width (m) | 1.7 | 2.5 |
| | length (m) | 4.0 | 8.0 |
| Dynamic vehicle | initial x (m) | 20 | 80 |
| | initial y (m) | $b_l(x)/2$ | $b_r(x)/2$ |
| | initial $\upsilon$ (ms$^{-1}$) | 0.5 | 3.5 |
| | width (m) | 1.7 | 2.5 |
| | length (m) | 4.0 | 8.0 |

Annex B. Nonlinear Programming Problem Formulation

For initial ego-vehicle state $z_0$, predictions of other road users $(o_{0:N}^{1:n}, \Sigma_{0:N}^{1:n})$ and the cost function J in (5), compute:

$$\underset{z_{1:N}, u_{0:N-1}}{\operatorname{argmin}} \; J(z_{0:N}, u_{0:N-1}) \tag{D-6}$$

under a discrete dynamical system (4) for timestep $k \in \{0, \ldots, N\}$, and the set of constraints:

$|\delta_k| \le \delta_{max}$, where $\delta_{max}$ is maximum allowed steering input $a_{min} \le a_k \le a_{max}$, where $[a_{min}, a_{max}]$ is the allowed range for acceleration/deceleration commands $|a_{k+1} - a_k| \le a_{max}^{\cdot}$, where $a_{max}^{\cdot}$ is the maximum allowed jerk $|\delta_{k+1} - \delta_k| \le \delta_{max}^{\cdot}$, where $\delta_{max}^{\cdot}$ is the maximum allowed angular jerk $0 \le v_{min} \le v_k \le v_{max}$, where $v_{min}$ is the minimum desired speed, and $v_{max}$ is the road's speed limit.

$R(\phi_k) (\alpha^T \circ [w/2 \; l/2]^T) + [x_k, y_k]^T \in \mathcal{B}$ for all $\alpha \in \{[1 \; 1], [-1 \; 1], [-1 \; -1], [1 \; -1]\}$, where $R(\phi_k) \in SO(2)$ is the rotation matrix for $\phi_k$, $\circ$ is the element-wise product operator, (l, w) are the vehicle's length and width respectively, and $\mathcal{B}$ is the drivable surface.

For all $\alpha \in \{[1 \; 1], [-1 \; 1], [-1 \; -1], [1 \; -1]\}$:

$$\begin{bmatrix} x_k^\alpha - x_k^i \\ y_k^\alpha - y_k^i \end{bmatrix}^T R(\phi_k^i)^T \begin{bmatrix} \frac{1}{a_k^{i\,2}} & 0 \\ 0 & \frac{1}{b_k^{i\,2}} \end{bmatrix} R(\phi_k^i) \begin{bmatrix} x_k^\alpha - x_k^i \\ y_k^\alpha - y_k^i \end{bmatrix} > 1 \tag{D-7}$$

Where $(x_k^i, y_k^i)$ is the centre and $(a_k^i, b_k^i)$ are the semi-major and semi-minor axes of an ellipse that inscribes road user i at a time k, and $R(\phi_k^i) \in SO(2)$ is the rotation matrix for orientation $\phi_k^i$.

The parameters of the optimisation are detailed in Table D-III

TABLE D-III

NLP WEIGHTS AND PARAMETERS

| Parameter | Value | Parameter | Value |
|---|---|---|---|
| L | 4.8 m | $\upsilon_{max}$ | 10 m/s |
| $\delta_{max}$ | 0.45 rad/s | $\omega_\delta$ | 2.0 |
| $a_{min}$ | $-3$ m/s$^2$ | $\omega_x$ | 0.1 |
| $a_{max}$ | 3 m/s$^2$ | $\omega_\upsilon$ | 2.5 |
| $\dot{a}_{max}$ | 0.5 m/s$^3$ | $\omega_y$ | 0.05 |
| $\dot{\delta}_{max}$ | 0.18 rad/s$^2$ | $\omega_a$ | 1.0 |
| $\upsilon_{min}$ | 0 m/s | | |

Annex C. Output Transformation Checks

The network produces a sequence of spatial positions, and the rest of the required input of the optimiser are computed from that sequence. A number of checks of upper and lower limits are applied to tame abnormalities in the network output and to improve the input to the optimiser.

Velocity limits $v_k \in [0, v_{max}]$

Acceleration/Deceleration limits: $a_k \in [a_{min}, a_{max}]$

Maximum jerk limit: $|a_{k+1} - a_k| \le a'_{max}$

Maximum steering angle limit: $|\delta_k| \le \delta_{max}$

Maximum angular jerk limit: $|\delta_{k+1} - \delta_k| \le \delta'_{max}$

Annex D. CARLA Dataset

We used Town02 and Town01 for generating a training dataset and a benchmarking dataset, respectively. To create the planning problems, we ran a planner to guide the ego vehicle in CARLA simulations and collected problem instances at a rate of 1.5 Hz in runs of 12 seconds. We added a maximum of 40 other vehicles (static or driven by CARLA's Autopilot) to each scenes, spawned randomly in each simulation. The training dataset has 20604 problems, and the benchmarking dataset has 1000 problems. We solved all the problems using 2s-OPT for the baseline.

Annex E: PILOT Experiments

We show results of PILOT compared to 2s-OPT; the two stage optimisation planner it was trained to imitate. Also, we present an ablation study which compares the imitation learning network output as an initialisation to the NLP solver compared to alternatives.

A. Setup

We follow the implementation in [D-4] for 2s-OPT, and we base the design of the post-hoc optimisation stage on the second stage of 2s-OPT using IPOPT [D-25] as a solver.

The first experiment uses a training dataset of 70,000 procedurally-generated problems of two-lane, urban driving in a residential setting. The problems are generated from 33 manually-designed base scenarios that contain a mixture of static and moving vehicles. The ego vehicle's position, heading and speed are perturbed at different timesteps of the original scenarios to create new configurations. Each of these configurations is considered a planning problem and solved by 2s-OPT, creating a high-quality expert dataset. We use an 80-20 split for training and testing datasets, respectively.

After initial training of the neural network, the training dataset is augmented with new problems generated interactively by the trained network when used in a driving simulator on new problems similar to the ones in the dataset. The new problems are solved by 2s-OPT as well to provide the expert trajectories. In a DAgger fashion, we generate 64 new problems and add them to the training dataset every training epoch.

The second experiment uses the CARLA simulator [D-22] where we generate 20,000 planning instances by running a baseline planner in randomly-generated scenarios in Town02, and compute their 2s-OPT solutions, to train PILOT. Then we run DAgger training on Town02 using the CARLA simulator and CARLA's Autopilot to control all non-ego agents. Lastly, we benchmark PILOT on a dataset generated in Town01 using 2s-OPT. More details about the process are in Appendix D.

B. Results

We report results on the quality of PILOT when compared to 2s-OPT using two metrics:

Solving time—the time required to initialise the NLP stage (i.e. using the MILP stage in 2s-OPT and using the neural network in PILOT), run NLP, and the total time. Lower solving time is better.

NLP final cost value—the cost value of the output of the NLP optimisation upon convergence as defined in Equation D-5. This reflects the quality of the solution, where lower final cost values are better.

We report these metrics for the procedurally-generated experiment and for the CARLA experiment by sampling a benchmarking 1000 problems from the respective test dataset and computing the two metrics for PILOT and 2s-OPT in problems solved by both methods. These problems are not seen by the neural network at training time. The results for the procedurally-generated experiment are shown in Table D-I(a), and the results for the CARLA experiment are shown in Table D-I(b).

TABLE D-I

SOLVING TIME AND SOLUTION QUALITY ON BENCHMARKING PROBLEMS

| Planner | Time (s) Initialisation | NLP | Total | NLP final cost value |
|---|---|---|---|---|
| PILOT | 0.02 ± 0.00 | 0.23 ± 0.37 | 0.25 ± 0.37 | 1.10 ± 1.32 |
| 2s-OPT | 0.86 ± 2.88 | 0.30 ± 0.89 | 1.16 ± 3.01 | 1.07 ± 1.16 |
| (a) The procedurally-generated experiment on 945 problems where both PILOT and 2s-OPT converged. | | | | |
| PILOT | 0.01 ± 0.00 | 0.11 ± 0.18 | 0.13 ± 0.18 | 0.56 ± 0.68 |
| 2s-OPT | 0.64 ± 1.22 | 0.16 ± 0.21 | 0.81 ± 1.27 | 0.54 ± 0.67 |
| (b) CARLA experiment on 929 problems where both PILOT and 2s-OPT converged. | | | | |

These results vindicate our approach of combining an imitation learning with an optimisation stage, resulting in an efficient approach to planning safe and comfortable trajectories. As the results show, time efficiency has a clear advantage (saving of ~78% and 84% respectively) using PILOT with no significant deterioration of the solution quality (drop of ~3% and 4% respectively). By testing in a different town from the training set in the CARLA experiment, we show our framework has at least reasonably generalised to this new environment.

Next, we present an ablation study on the quality of initialising the NLP stage using the output of the imitation learning network compared to alternatives. We use the same benchmarking problems from the procedurally-generated experiment above. The alternative initialisations we compare against include: None initialisation which sets x, y, v and $\theta$ to zero at all timesteps; ConstVel a constant velocity initialisation that keeps $\theta$ constant while the vehicle moves with a constant speed; and ConstAccel/ConstDecel constant acceleration and deceleration initialisations are similar but the speed is changed with a constant rate until it reaches the allowed speed limit or 0, respectively.

We compare these alternatives relative to the original MILP initialisation of the 2s-OPT framework, as a baseline. We use three metrics:

Convergence rate—constrained, non-linear optimisation in general is not guaranteed to converge to a feasible solution, hence the quality of an initialisation would be reflected in a higher percentage of solved problems. We report the percentage of solved problems out of the problems that 2s-OPT solved.

NLP solving time—we report the average difference in solving time (relative to MILP) in the problems that both the initialisation method and 2s-OPT solved.

Final NLP cost value—for problems that both the initialisation method and 2s-OPT solved, we report the percentage change in the quality of the optimised trajectory compared to MILP.

The results are shown in Table D-II.

TABLE D-II

INITIALISATION ABLATION—NLP COMPARISON RELATIVE TO 2S-OPT IN AVERAGE SOLVING TIME AND FINAL NLP COST (IN PROBLEMS SOLVED BY 2s-OPT AND THE PARTICULAR INITIALISATION) AND CONVERGENCE RATE.

| Initialisation | NLP solving time (s) | Final NLP cost (%) | converged (%) |
|---|---|---|---|
| None | −0.00 | +10.7% | 97% |
| ConstVel | −0.29 | +10.8% | 91% |
| ConstAccel | −0.16 | +0.0% | 86% |
| ConstDecel | −0.34 | +17.0% | 93% |
| IL-NN (PILOT) | −0.91 | +0.9% | 95% |
| MILP (2s-OPT) | — | — | 100% |

As the results show, PILOT's neural network initialisation produces trajectories that are easier to optimise (as reflected in the reduction in NLP solving time) with a small increase in the final cost in average when compared to the MILP initialisation of 2s-OPT. One of the alternatives (ConstAccel) has a slight advantage in final NLP cost, but it takes more time when it converges and it fails to converge in 9% more examples to a solution.

REFERENCES

Reference is also made in the above to the following, each of which is incorporated herein by reference in its entirety:

[C-1] W. Schwarting, J. Alonso-Mora, L. Paull, S. Karaman, and D. Rus, "Safe nonlinear trajectory generation for parallel autonomy with a dynamic vehicle model," *IEEE Transactions on Intelligent Transportation Systems*, vol. 19, no. 99, 2017.

[C-7] I. E. Grossmann, V. Voudouris, O. Ghattas, et al., "Mixed-integer linear programming reformuilations [sic] for some nonlinear discrete design optimization problems," *Technical Report, Carnegie Mellon University*, 1991.

[C-8] H. P. Williams, *Model building in mathematical programming*. John Wiley & Sons, 2018

[C-9] J. Omer and J.-L. Farges, "Hybridization of nonlinear and mixed-integer linear programming for aircraft separation with trajectory recovery," *IEEE Transactions on Intelligent Transportation Systems*, vol 14, no. 3, pp. 1218-1230, 2013.

[C-10] A. H. Land and A. G. Doig, "An automatic method for solving discrete programming problems," in 50 *Years of Integer Programming* 1958-2008, pp. 105-132, Springer, 2010.

[C-11] A. Neumaier, "Complete search in continuous global optimization and constraint satisfaction," *Acta numerica*, vol. 13, pp. 271-369, 2004.

[C-12] X. Geng and Y. Xi, "Suboptimality analysis of receding horizon predictive control with terminal constraints," *IFAC Proceedings Volumes*, vol. 32, no. 2, pp. 2984-2988, 1990.

[C-13] L. Grune and A. Rantzer, "On the infinite horizon performance of receding horizon controllers," *IEEE Transactions on Automatic Control*, vol. 53, no. 9, pp. 2100-2111, 2008.

[D-1] I. Batkovic, M. Zanon, M. Ali, and P. Falcone, "Real-time constrained trajectory planning and vehicle control for proactive autonomous driving with road users," in 2019 18th European Control Conference (ECC). IEEE, 2019, pp. 256-262.

[D-2] J. Chen, W. Zhan, and M. Tomizuka, "Autonomous driving motion planning with constrained iterative LQR," IEEE Transactions on Intelligent Vehicles, vol. 4, no. 2, pp. 244-254, 2019.

[D-3] W. Schwarting, J. Alonso-Mora, L. Paull, S. Karaman, and D. Rus, "Safe nonlinear trajectory generation for parallel autonomy with a dynamic vehicle model," IEEE Transactions on Intelligent Transportation Systems, vol. 19, no. 99, 2017.

[D-4] F. Eiras, M. Hawasly, S. V. Albrecht, and S. Ramamoorthy, "Twostage optimization-based motion planner for safe urban driving," arXiv preprint arXiv: 2002.02215, 2020.

[D-5] A. Sadat, S. Casas, M. Ren, X. Wu, P. Dhawan, and R. Urtasun, "Perceive, predict, and plan: Safe motion planning through interpretable semantic representations," arXiv preprint arXiv:2008.05930, 2020.

[D-6] M. Bojarski, D. Del Testa, D. Dworakowski, B. Firner, B. Flepp, P. Goyal, L. D. Jackel, M. Monfort, U. Muller, J. Zhang et al., "End to end learning for self-driving cars," arXiv preprint arXiv:1604.07316, 2016.

[D-7] Y. Pan, C.-A. Cheng, K. Saigol, K. Lee, X. Yan, E. A. Theodorou, and B. Boots, "Imitation learning for agile autonomous driving," The International Journal of Robotics Research, vol. 39, no. 2-3, pp. 286-302, 2020.

[D-8] J. Hawke, R. Shen, C. Gurau, S. Sharma, D. Reda, N. Nikolov, P. Mazur, S. Micklethwaite, N. Griffiths, A. Shah et al., "Urban driving with conditional imitation learning," in 2020 IEEE International Conference on Robotics and Automation (ICRA). IEEE, 2020, pp. 251-257.

[D-9] D. Chen, B. Zhou, V Koltun, and P. Krahenbühl, "Learning by cheating," in Conference on Robot Learning. PMLR, 2020, pp. 66-75.

[D-10] B. Paden, M. Čáp, S. Z. Yong, D. Yershov, and E. Frazzoli, "A' survey of motion planning and control techniques for self-driving urban vehicles," IEEE Transactions on intelligent vehicles, vol. 1, no. 1, pp. 33-55, 2016.

[D-11] S. V. Albrecht, C. Brewitt, J. Wilhelm, F. Eiras, M. Dobre, and S. Ramamoorthy, "Integrating planning and interpretable goal recognition for autonomous driving," arXiv preprint arXiv:2002.02277, 2020.

[D-12] J. A. DeCastro, K. Leung, N. Arechiga, and M. Pavone, "Interpretable" policies from formally-specified temporal properties," 2020.

[D-13] W. Schwarting, J. Alonso-Mora, L. Paull, S. Karaman, and D. Rus, "Safe nonlinear trajectory generation for parallel autonomy with a dynamic vehicle model," IEEE Transactions on Intelligent Transportation Systems, vol. 19, no. 9, pp. 2994-3008, 2017.

[D-14] D. A. Pomerleau, "Alvinn: An autonomous land vehicle in a neural network," in Advances in neural information processing systems, 1989, pp. 305-313.

[D-15] F. Codevilla, E. Santana, A. M. Lopez, and A. Gaidon, "Exploring the" limitations of behavior cloning for autonomous driving," in Proceedings of the IEEE International Conference on Computer Vision, 2019, pp. 9329-9338.

[D-16] A. Filos, P. Tigas, R. McAllister, N. Rhinehart, S. Levine, and Y Gal, "Can autonomous vehicles identify, recover from, and adapt to distribution shifts?" in International Conference on Machine Learning (ICML), 2020.

[D-17] S. Ross, G. Gordon, and D. Bagnell, "A reduction of imitation learning and structured prediction to no-regret online learning," in Proceedings of the fourteenth international conference on artificial intelligence and statistics, 2011, pp. 627-635.

[D-18] M. Bansal, A. Krizhevsky, and A. Ogale, "Chauffeurnet: Learning to drive by imitating the best and synthesizing the worst," arXiv preprint arXiv: 1812.03079, 2018.

[D-19] J. Chen, B. Yuan, and M. Tomizuka, "Deep imitation learning for autonomous driving in generic urban scenarios with enhanced safety," in 2019 IEEE/RSJ International Conference on Intelligent Robots and Systems (IROS), 2019, pp. 2884-2890.

[D-20] W. Zhan, J. Li, Y. Hu, and M. Tomizuka, "Safe and feasible motion generation for autonomous driving via constrained policy net," in IECON 2017—43rd Annual Conference of the IEEE Industrial Electronics Society, 2017, pp. 4588-4593.

[D-21] T. Tosun, E. Mitchell, B. Eisner, J. Huh, B. Lee, D. Lee, V Isler, H. S. Seung, and D. Lee, "Pixels to plans: Learning non-prehensile manipulation by imitating a planner," arXiv preprint arXiv:1904.03260, 2019.

[D-22] A. Dosovitskiy, G. Ros, F. Codevilla, A. Lopez, and V. Koltun, "CARLA: An open urban driving simulator," arXiv preprint arXiv:1711.03938, 2017.

[D-23] C. A. Floudas and P. M. Pardalos, State of the art in global optimization: computational methods and applications. Springer Science & Business Media, 2013, vol. 7.

[D-24] J. Nocedal and S. Wright, Numerical optimization. Springer Science & Business Media, 2006.

[D-25] A. Wachter and L. T. Biegler, "On the implementation of an interior-" point filter line-search algorithm for large-scale nonlinear programming," Mathematical programming, vol. 106, no. 1, pp. 25-57, 2006.

[D-26] A. Zanelli, A. Domahidi, J. Jerez, and M. Moran, "Forces nlp: an efficient implementation of interior-point methods for multistage nonlinear nonconvex programs," International Journal of Control, pp. 1-17, 2017.

[D-27] A. L. Friesen and P. Domingos, "Recursive decomposition for nonconvex optimization," arXiv preprint arXiv:1611.02755, 2016.

[D-28] T. S. Lembono, A. Paolillo, E. Pignat, and S. Calinon, "Memory of motion for warm-starting trajectory optimization," IEEE Robotics and Automation Letters, vol. 5, no. 2, pp. 2594-2601, 2020.

[D-29] M. Mirman, T. Gehr, and M. Vechev, "Differentiable abstract interpretation for provably robust neural networks," in International Conference on Machine Learning, 2018, pp. 3578-3586.

[D-30] E. W. Ayers, F. Eiras, M. Hawasly, and I. Whiteside, "PaRoT: A practical framework for robust deep neural network training," in NASA Formal Methods. Springer International Publishing, 2020, pp. 63-84.

[D-31] C. Liu, T. Arnon, C. Lazarus, C. Barrett, and M. J. Kochenderfer, "Algorithms for verifying deep neural networks," arXiv preprint arXiv:1903.06758, 2019.

[D-32] D. P. Kingma and J. Ba, "Adam: A method for stochastic optimization," arXiv preprint arXiv:1412.6980, 2014.

[D-33] D. Bertsimas and B. Stellato, "Online mixed-integer optimization in milliseconds," arXiv preprint arXiv: 1907.02206, 2019.

[D-34] S. Choudhury, M. Bhardwaj, S. Arora, A. Kapoor, G. Ranade, S. Scherer, and D. Dey, "Data-driven planning via imitation learning," The International Journal of Robotics Research, vol. 37, no. 13-14, pp. 1632-1672, 2018.

[E-15] LLC Gurobi Optimization. Gurobi optimizer reference manual, 2019, URL http://www.qurobi.com.

[E-25] Wilko Schwarting, Javier Alonso-Mora, Liam Paull, Sertac Karaman, and Daniela Rus. Safe nonlinear trajectory generation for parallel autonomy with a dynamic vehicle model. IEEE Transactions on Intelligent Transportation Systems, 19(99), 2017.

[E-27] Martin Trelber, Angar Hennecke, and Dirk Helbing. Congested traffic states in empirical observations and microscopic simulations. Physical Review E, 62(2):1805, 2000.

[E-29] Andreas Wachter and Lorenz T Biegler. On the implementation of an interior-point filter line-search algorithm for large-scale nonlinear programming. Mathematical programming, 106(1):25-27, 2006.

The invention claimed is:

1. A computer system for planning mobile robot trajectories, the computer system comprising one or more hardware processors configured to:

receive a set of scenario description parameters describing a scenario and a desired goal for a mobile robot in the scenario;

implement a runtime optimizer to compute a final mobile robot trajectory for the mobile robot that substantially optimizes a cost function for the desired goal in the scenario, subject to a set of hard constraints for the scenario that the final mobile robot trajectory is guaranteed to satisfy;

implement a function approximator to compute, from the set of scenario description parameters, initialization data defining an initial mobile robot trajectory for the mobile robot;

initialize the runtime optimizer with the initialization data;

guide the runtime optimizer from the initial mobile robot trajectory to the final mobile robot trajectory that satisfies the set of hard constraints, the function approximator having been trained on example sets of scenario description parameters and ground truth initialization data for the example sets of scenario description parameters;

generate a series of control signals for controlling the mobile robot to follow the final mobile robot trajectory; and control motion of the mobile robot to follow the final mobile robot trajectory based on the series of control signals.

2. The computer system of claim 1, wherein the function approximator has been trained to approximate a reference planner, the ground truth initialization data having been generated by applying the reference planner to the example sets of scenario description parameters.

3. The computer system of claim 1, wherein the runtime optimizer is configured to determine a series of control actions, and compute the final mobile robot trajectory by applying a robot dynamics model to the series of control actions.

4. The computer system of claim 3, wherein the initialization data comprises an initial sequence of control actions defining the initial mobile robot trajectory.

5. The computer system of claim 1, wherein the set of hard constraints comprise one or more collision avoidance constraints for one or more static or moving obstacles in the scenario, and location(s) of the one or more static or moving obstacles are encoded in the set of scenario description parameters for use by the function approximator.

6. The computer system of claim 1, wherein the set of hard constraints comprise one or more permitted area constraints for keeping the mobile robot within a permitted area, and the permitted area is encoded in the set of scenario description parameters for use by the function approximator.

7. The computer system of claim 1, wherein the desired goal is defined relative to a reference path, and the cost function encourages achievement of the desired goal by penalizing at least one of lateral deviation from the reference path, and longitudinal deviation from a reference location on the reference path.

8. The computer system of claim 7, wherein the initial and final trajectories are represented in a frame of reference defined by the reference path.

9. The computer system of claim 1, wherein the function approximator has a convolutional neural network (CNN) architecture.

10. The computer system of claim 9, wherein the set of hard constraints comprise:
   collision avoidance constraints for one or more static or moving obstacles in the scenario, wherein location(s) of the one or more static or moving obstacles are encoded in the set of scenario description parameters for use by the function approximator; or
   one or more permitted area constraints for keeping the mobile robot within a permitted area, wherein the permitted area is encoded in the set of scenario description parameters for use by the function approximator;
   wherein the computer system is configured to transform the set of scenario description parameters into an input tensor comprising one or more images visualizing the permitted area or the location(s) of the obstacles.

11. The computer system of claim 10, wherein the set of hard constraints comprise collision avoidance constraints for one or more static or moving obstacles in the scenario, wherein the input tensor comprises multiple images visualizing predicted locations of the obstacles at different time instants.

12. The computer system of claim 10, wherein the desired goal is defined relative to a reference path, and the cost function encourages achievement of the desired goal by penalizing at least one of lateral deviation from the reference path, and longitudinal deviation from a reference location on the reference path, and wherein the one or more images encode the reference path.

13. The computer system of claim 12, wherein the initial and final trajectories are represented in a frame of reference defined by the reference path, wherein the one or more images encode the reference path by visualizing the permitted area or the location(s) of the obstacles in the frame of reference defined by the reference path.

14. The computer system of claim 1, wherein the function approximator encodes the initial mobile robot trajectory as a set of smooth function parameters.

15. The computer system of claim 1, wherein the runtime optimizer is a non-linear optimizer.

16. A computer program embodied on non-transitory computer-readable media for programming one or more computers to implement steps of:
   receiving a set of scenario description parameters describing a scenario and a desired goal for a mobile robot in the scenario;
   computing, by applying a function approximator to the set of scenario description parameters, initialization data defining an initial mobile robot trajectory for the mobile robot; and
   computing, by applying a runtime optimizer, a final mobile robot trajectory for the mobile robot that substantially optimizes a cost function for the desired goal in the scenario, subject to a set of hard constraints for the scenario that the final mobile robot trajectory is guaranteed to satisfy,
   initializing the runtime optimizer with the initialization data;
   guiding the runtime optimizer from the initial mobile robot trajectory to the final mobile robot trajectory that satisfies the set of hard constraints, the function approximator having been trained on example sets of scenario description parameters and ground truth initialization data for the example sets of scenario description parameters;
   generating a series of control signals for controlling the mobile robot to follow the final mobile robot trajectory; and
   controlling motion of the mobile robot to follow the final mobile robot trajectory based on the series of control signals.

* * * * *